(12) United States Patent
Kawabe et al.

(10) Patent No.: US 10,072,116 B2
(45) Date of Patent: Sep. 11, 2018

(54) MODIFIED PROPYLENE-(α-OLEFIN) COPOLYMER, METHOD FOR PRODUCING SAME, COATING MATERIAL COMPRISING SAME, RESIN COMPOSITION FOR MOLDING USE, AND HOT-MELT COMPOSITION

(71) Applicant: MITSUI CHEMICALS, INC., Tokyo (JP)

(72) Inventors: Kuniaki Kawabe, Chiba (JP); Hirotaka Kanaya, Chiba (JP); Masakazu Tanaka, Yokohama (JP); Toshiyuki Ito, Ichihara (JP); Masako Yoshida, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 119 days.

(21) Appl. No.: 15/034,136

(22) PCT Filed: Nov. 5, 2014

(86) PCT No.: PCT/JP2014/005567
§ 371 (c)(1),
(2) Date: May 3, 2016

(87) PCT Pub. No.: WO2015/068385
PCT Pub. Date: May 14, 2015

(65) Prior Publication Data
US 2016/0280828 A1    Sep. 29, 2016

(30) Foreign Application Priority Data

Nov. 5, 2013 (JP) ................. 2013-229176

(51) Int. Cl.
| | | |
|---|---|---|
| *C08F 255/10* | (2006.01) | |
| *C08F 8/00* | (2006.01) | |
| *C08F 210/06* | (2006.01) | |
| *C08F 255/08* | (2006.01) | |
| *C08L 31/04* | (2006.01) | |
| *C08L 33/04* | (2006.01) | |
| *C08L 51/06* | (2006.01) | |
| *C08L 69/00* | (2006.01) | |
| *C09D 151/06* | (2006.01) | |
| *C09J 151/06* | (2006.01) | |
| *C08F 4/659* | (2006.01) | |
| *C08F 4/6592* | (2006.01) | |

(52) U.S. Cl.
CPC .............. *C08F 255/10* (2013.01); *C08F 8/00* (2013.01); *C08F 210/06* (2013.01); *C08F 255/08* (2013.01); *C08L 31/04* (2013.01); *C08L 33/04* (2013.01); *C08L 51/06* (2013.01); *C08L 69/00* (2013.01); *C09D 151/06* (2013.01); *C09J 151/06* (2013.01); *C08F 4/65912* (2013.01); *C08F 4/65927* (2013.01)

(58) Field of Classification Search
CPC .... C08F 255/10; C08F 210/06; C08F 255/08; C08F 8/00; C08F 4/65912; C08F 4/65927; C08L 31/04; C08L 33/04; C08L 51/06; C08L 69/00; C09D 151/06; C09J 151/06
USPC ......................................................... 524/504
See application file for complete search history.

(56) References Cited

U.S. PATENT DOCUMENTS

| | | | |
|---|---|---|---|
| 4,299,754 A | 11/1981 | Shiomi et al. | |
| 4,892,851 A | 1/1990 | Ewen et al. | |
| 4,952,649 A | 8/1990 | Kioka et al. | |
| 4,971,937 A | 11/1990 | Albizzati et al. | |
| 5,036,034 A | 7/1991 | Ewen | |
| 5,539,043 A * | 7/1996 | Kimura ................ | C08L 51/06 524/236 |
| 5,539,067 A | 7/1996 | Parodi et al. | |
| 5,998,547 A | 12/1999 | Hohner | |
| 6,939,928 B1 | 9/2005 | Kawai et al. | |
| 9,606,465 B2 * | 3/2017 | Kawabe ............... | G03G 9/0904 |
| 2003/0055179 A1 | 3/2003 | Ota et al. | |
| 2011/0196103 A1 | 8/2011 | Kawahara et al. | |
| 2012/0329350 A1 * | 12/2012 | Davis ................... | C08L 23/142 442/327 |
| 2013/0266806 A1 | 10/2013 | Nagano et al. | |
| 2015/0056548 A1 | 2/2015 | Kawabe et al. | |

FOREIGN PATENT DOCUMENTS

| | | |
|---|---|---|
| EP | 2 845 875 A1 | 3/2015 |
| JP | S57-063310 A | 4/1982 |
| JP | S58-083006 A | 5/1983 |
| JP | S62-021027 B2 | 5/1987 |
| JP | H02-041303 A | 2/1990 |

(Continued)

OTHER PUBLICATIONS

Extended European Search Report dated May 23, 2017 in corresponding European Patent Application No. 14860398.8.

(Continued)

*Primary Examiner* — Ling Siu Choi
*Assistant Examiner* — Ronald Grinsted
(74) *Attorney, Agent, or Firm* — Foley & Lardner LLP

(57) ABSTRACT

The purpose of the present invention is to provide a polar-group-containing propylene-type wax having excellent properties including a low melting point. A modified propylene-(α-olefin) copolymer (A) according to the present invention is produced by grafting at least one compound selected from an unsaturated carboxylic acid, a derivative of the unsaturated carboxylic acid and an unsaturated sulfonic acid salt onto a propylene-(α-olefin) copolymer (A1) and has an acid value of 1 to 100 KOHmg/g, wherein the propylene-(α-olefin) copolymer (A1) comprises 60 to 95 mol % of a propylene-derived constituent unit (a) and 5 to 40 mol % of a constituent unit (b) derived from an α-olefin having 4 or more carbon atoms, and satisfies the specific requirements (i) to (iii).

20 Claims, No Drawings

(56) References Cited

FOREIGN PATENT DOCUMENTS

| | | |
|---|---|---|
| JP | H02-232286 A | 9/1990 |
| JP | H03-000706 A | 1/1991 |
| JP | H03-115444 A | 5/1991 |
| JP | H03-193796 A | 8/1991 |
| JP | H04-218508 A | 8/1992 |
| JP | 2003-105022 A | 4/2003 |
| JP | 3476793 B2 | 12/2003 |
| JP | 2004-059867 A | 2/2004 |
| JP | 3658827 B2 | 6/2005 |
| JP | 4526603 B2 | 8/2010 |
| JP | 2012-144692 A | 8/2012 |
| WO | WO-01/027124 A1 | 4/2001 |
| WO | WO-01/053369 A1 | 7/2001 |
| WO | WO-2004/087775 A1 | 10/2004 |
| WO | WO-2013/146605 A1 | 10/2013 |

OTHER PUBLICATIONS

International Search Report for PCT/JP2014/005567 dated Dec. 9, 2014.

* cited by examiner

MODIFIED PROPYLENE-(α-OLEFIN) COPOLYMER, METHOD FOR PRODUCING SAME, COATING MATERIAL COMPRISING SAME, RESIN COMPOSITION FOR MOLDING USE, AND HOT-MELT COMPOSITION

TECHNICAL FIELD

The present invention relates to a modified propylene-α-olefin copolymer and a method for producing the same, and a coating material, a moldable resin composition and a hot melt composition containing the same.

BACKGROUND ART

What is called a polyolefin wax containing a low molecular weight olefin polymer is used in a wide range of applications including a coating agent in an emulsion form, a solution form or the like, a mold releasing agent used together with a toner or the like, a resin modifier, a hot melt adhesive and the like.

Since a polyolefin structure basically has no polar group, it is used, in many cases, in combination with a nonpolar or low-polar component. It is known that polar groups are difficult to directly introduce into a polyolefin because a transition metal catalyst working as a catalyst in olefin polymerization is poisoned by such polar groups to largely degrade the polymerization activity.

As a method for producing a polyolefin wax, not only a method in which an olefin is lowly polymerized by using the above-described transition metal catalyst but also a method in which a highly polymerized olefin polymer is thermally decomposed is known.

When a polyolefin wax is used in combination with a resin having polarity such as an acrylic or an engineering plastic, it is preferable, in many cases, to introduce polar groups into the polyolefin wax. As a method for introducing polar groups, a method in which the polyolefin wax is oxidized in air, and a method in which the polyolefin wax is reacted by using a radical initiator in the presence of a polar compound having a double bond such as maleic anhydride are known (see, for example, PTL 1).

PTL 2 discloses that, as a method for introducing a polar group into a wax having 3 or more carbon atoms such as a propylene wax, a method in which a polyolefin wax obtained by direct polymerization using a transition metal catalyst or the like is reacted with a polar compound having a double bond such as maleic anhydride is preferred. Further, PTL 2 discloses that when a polypropylene wax obtained by thermal decomposition is subjected to a radical reaction with maleic anhydride, viscosity unavoidably increases. Furthermore, PTL 2 and the like disclose that when a propylene-based wax is oxidized in air, it is predominantly decomposed, and hence the resultant easily becomes oily.

On the other hand, recently, there is a tendency of demanding a polyolefin wax having a low melting point in the market. This tendency is accompanied by a tendency of considering significance of energy saving. Specifically, when the melting point of a wax is lowered, it is presumed that the following effects can be expected. When the wax is used, for example, in a toner, the temperature of a fixing drum of a copying machine can be lowered; or when the wax is used in a hot melt adhesive, the adhesion temperature of the hot melt adhesive can be lowered.

CITATION LIST

Patent Literature

PTL 1
Japanese Patent Application Laid-Open No. 2004-059867
PTL 2
Japanese Patent No. 4526603

SUMMARY OF INVENTION

Technical Problem

A propylene-based wax tends to have a higher rigidity feeling and solidity than an ethylene-based wax. As the propylene-based wax, a polypropylene (PP) wax, a propylene-ethylene copolymer (PER) wax and the like are known. When the melting point of the PER wax is lowered, however, the wax easily becomes rubbery and hence is difficult to handle.

Further, even though the melting point of a propylene-based wax can be lowered, when the propylene-based wax is to be produced by slurry polymerization or solution polymerization, it is necessary to perform steps of removing a solvent, drying, and the like, and hence, it cannot be said that sufficient productivity is always attained. In other words, there has been a tendency that the thermal decomposition is more advantageous for the production of a propylene-based wax having a low melting point.

Under these circumstances, the present inventors have found that a propylene-based wax having an appropriate number of vinylidene groups can be produced by, for example, thermally decomposing a copolymer containing a propylene unit as well as a $C_{4+}$ α-olefin unit; and that a modified propylene-based wax that has a low melting point, is less sticky and can retain crystallinity and attain high hardness even when a polar groups are contained can be obtained by modifying the thus obtained propylene-based wax with a polar compound having a double bond. Further, since the thus obtained modified propylene-based wax appropriately contains polar groups in molecular end portions, it is presumed that the wax not only retains superior crystallinity and can easily attain high hardness but also can attain high compatibility with another resin and high affinity with a filler.

Accordingly, an object of the present invention is to provide, by modifying a propylene-based wax obtained by thermal decomposition and containing a $C_{4+}$ α-olefin unit with a polar compound having a double bond, a polar group-containing propylene-based wax having a low melting point, less sticky and exhibiting such excellent properties that crystallinity can be retained and high hardness can be attained even when polar groups are contained.

Solution to Problem

The present inventors earnestly studied a method for solving the above-described problem. As a result, means for solving the problem was found on the basis of the following concepts.

The phenomenon that the viscosity increases in the modification reaction of the thermally decomposed polypropylene wax described in PTL 2 seems to be caused for the following reason. In the step of thermal decomposition in the production of the thermally decomposed polypropylene wax, main chain cleavage is triggered by production of a radical through hydrogen abstraction from carbon bonded to a side-group methyl group of a propylene unit, and one of two terminals produced by the cleavage becomes a vinylidene group (CH$_2$=CRC—) and the other becomes a structure having a secondary carbon radical (.CRC—). Due to abstraction of primary hydrogen adjacent to the secondary carbon radical, a highly reactive vinyl group (CH$_2$=CH—) is formed in some cases, and a crosslinking reaction for the vinyl group via a polar compound having a double bond may simultaneously occur in acid modification.

Therefore, the present inventors presumed as follows and examined further. When not only propylene but also a C$_{4+}$ α-olefin unit such as butene is introduced, a double bond of an internal olefin type that seems to be less reactive can be formed instead of the vinyl group, resulting in inhibiting the crosslinking reaction. As a result, it was found that the considerable viscosity increase can be suppressed even when a propylene-based wax obtained by thermal decomposition and containing a propylene unit and a C$_{4+}$ α-olefin unit is reacted with a polar compound having a double bond.

Further, it was found that the melting point of a polar group-containing propylene-based wax can be effectively lowered when a C$_{4+}$ α-olefin unit is contained together with a propylene unit. On the basis of these findings, the present invention was accomplished.

[1] A modified propylene-α-olefin copolymer (A) having an acid value of 0.5 to 100 KOHmg/g obtained by grafting at least one selected from unsaturated carboxylic acids and derivatives thereof and unsaturated sulfonic acids and salts thereof onto a propylene-α-olefin copolymer (A1), the propylene-α-olefin copolymer (A1) containing 60 to 95 mol % of a propylene-derived constitutional unit (a) and 5 to 40 mol % of a C$_{4+}$ α-olefin-derived constitutional unit (b), wherein a total amount of the constitutional unit (a) and the constitutional unit (b) is 100 mol %, and satisfying all of requirements below (i) to (iv):

(i) a weight average molecular weight (Mw) measured by GPC of 3,000 to 40,000;

(ii) a melting point (Tm) measured by DSC of 60 to 110° C.;

(iii) a half width of a crystalline melting point peak measured by the DSC of 1 to 20° C.; and (iv) a number of vinylidene groups per 1,000 carbon atoms measured by $^1$H-NMR of 0.5 to 5.

[2] The modified propylene-α-olefin copolymer (A) according to [1], wherein the propylene-α-olefin copolymer (A1) is obtained by thermally decomposing a propylene-C$_{4+}$ α-olefin copolymer (A2).

[3] The modified propylene-α-olefin copolymer (A) according to claim 2, wherein the propylene-C$_{4+}$ α-olefin copolymer (A2) contains 60 to 95 mol % of a propylene-derived constitutional unit (a') and 5 to 40 mol % of a C$_{4+}$ α-olefin-derived constitutional unit (b'), wherein a total amount of the constitutional unit (a') and the constitutional unit (b') is 100 mol %, and satisfies all of requirements below (i') to (iii'):

(i') a weight average molecular weight (Mw) measured by the GPC of 50,000 to 1,000,000;

(ii') a melting point (Tm) measured by the DSC of 60 to 120° C.; and (iii') a half width of a crystalline melting point peak measured by the DSC of 1 to 20° C.

[4] The modified propylene-α-olefin copolymer (A) according to any one of [1] to [3], wherein the propylene-α-olefin copolymer (A1) further satisfies requirement below (v):

(v) a ΔH of a melting peak measured by the DSC of 40 to 100 J/g.

[5] The modified propylene-α-olefin copolymer (A) according to any one of [1] to [4], wherein, assuming that a crystallization temperature of the modified propylene-α-olefin copolymer (A) is Tc(A) and a crystallization temperature of the propylene-α-olefin copolymer (A1) is Tc(A1), a crystallization temperature ratio Tc(A1)/Tc(A) is 1.0 to 1.6.

[6] A method for producing a modified propylene-α-olefin copolymer (A) comprising:

thermally decomposing a propylene-C$_{4+}$ α-olefin copolymer (A2) to obtain a propylene-α-olefin copolymer (A1) containing 60 to 95 mol % of a propylene-derived constitutional unit (a) and 5 to 40 mol % of a C$_{4+}$ α-olefin-derived constitutional unit (b), wherein a total amount of the constitutional unit (a) and the constitutional unit (b) is 100 mol %, and satisfying all of requirements below (i) to (iii):

(i) a weight average molecular weight (Mw) measured by GPC of 3,000 to 40,000;

(ii) a melting point (Tm) measured by DSC of 60 to 110° C.; and (iii) a half width of a crystalline melting point peak measured by the DSC of 1 to 20° C.; and graft polymerizing at least one selected from unsaturated carboxylic acids and derivatives thereof and unsaturated sulfonic acids and salts thereof onto the propylene-α-olefin copolymer (A1) to obtain a modified propylene-α-olefin copolymer (A) having an acid value of 1 to 100 KOHmg/g.

[7] The method for producing a modified propylene-α-olefin copolymer (A) according to [6], wherein the propylene-α-olefin copolymer (A1) is obtained by thermally decomposing the propylene-C$_{4+}$ α-olefin copolymer (A2) at 300 to 450° C. for 5 minutes to 10 hours.

[8] The method for producing a modified propylene-α-olefin copolymer (A) according to [6] or [7], wherein the propylene-α-olefin copolymer (A1) further satisfies requirement below (iv):

(iv) a number of vinylidene groups per 1,000 carbon atoms measured by $^1$H-NMR of 0.5 to 5.

[9] The method for producing a modified propylene-α-olefin copolymer (A) according to any one of [6] to [8], wherein the propylene-C$_{4+}$ α-olefin copolymer (A2) contains 60 to 95 mol % of a propylene-derived constitutional unit (a') and 5 to 40 mol % of a C$_{4+}$α-olefin-derived constitutional unit (b'), wherein a total amount of the constitutional unit (a') and the constitutional unit (b') is 100 mol %, and satisfies all of requirements below (i') to (iii'):

(i') a weight average molecular weight (Mw) measured by the GPC of 50,000 to 1,000,000;

(ii') a melting point (Tm) measured by the DSC of 60 to 120° C.; and (iii') a half width of a crystalline melting point peak measured by the DSC of 1 to 20° C.

[10] A resin composition comprising the modified propylene-α-olefin copolymer (A) according to any one of [1] to [5], and a second resin (B1), wherein a weight ratio between the modified propylene-α-olefin copolymer (A) and the second resin (B1) is 1/99 to 90/10.

[11] A coating material comprising 100 parts by weight of water or an organic solvent, and 0.1 to 100 parts by weight of the modified propylene-α-olefin copolymer (A) according to any one of [1] to [5] dissolved or dispersed in the water or the organic solvent.

[12] A coating material comprising 100 parts by weight of water or an organic solvent, and 0.1 to 100 parts by weight in total of the modified propylene-α-olefin copolymer (A) according to any one of [1] to [5] and a second resin (B1) dissolved or dispersed in the water or the organic solvent, wherein a weight ratio between the modified propylene-α-olefin copolymer (A) and the second resin (B1) is 1/99 to 90/10.

[13] The coating material according to [11] or [12], wherein the organic solvent has an SP value in a range of 7 to 12.

[14] The coating material according to any one of [11] to [13], wherein the organic solvent contains at least one selected from hydrocarbon-based solvents, alcohol-based solvents and ester-based solvents.

[15] The coating material according to any one of [11] to [14], wherein the modified propylene-α-olefin copolymer (A) is completely dissolved in the organic solvent at a temperature of 50° C. or more.

[16] A moldable resin composition comprising: 100 to 50 parts by weight of at least one resin (B2) selected from the group consisting of thermoplastic resins and thermosetting resins; 0 to 50 parts by weight of an inorganic reinforcing material (C), wherein a total amount of the resin (B2) and the reinforcing material (C) is 100 parts by weight; and 0.01 to 10 parts by weight of the modified propylene-α-olefin copolymer (A) according to any one of [1] to [5].

[17] A hot melt composition comprising: 100 parts by weight of a base polymer (B3); 10 to 300 parts by weight of a tackifier (D); and 1 to 100 parts by weight of the modified propylene-α-olefin copolymer (A) according to any one of [1] to [5].

[18] A paint comprising the modified propylene-α-olefin copolymer (A) according to any one of [1] to [5], or the modified propylene-α-olefin copolymer (A) according to any one of [1] to [5] and a second resin (B1).

[19] A primer comprising the modified propylene-α-olefin copolymer (A) according to any one of [1] to [5], or the modified propylene-α-olefin copolymer (A) according to any one of [1] to [5] and a second resin (B1).

[20] An adhesive comprising the modified propylene-α-olefin copolymer (A) according to any one of [1] to [5], or the modified propylene-α-olefin copolymer (A) according to any one of [1] to [5] and a second resin (B1).

[21] A pressure-sensitive adhesive comprising the modified propylene-α-olefin copolymer (A) according to any one of [1] to [5], or the modified propylene-α-olefin copolymer (A) according to any one of [1] to [5] and a second resin (B1).

[22] A sintering aid comprising the modified propylene-α-olefin copolymer (A) according to any one of [1] to [5], or the modified propylene-α-olefin copolymer (A) according to any one of [1] to [5] and a second resin (B1).

Advantageous Effects of Invention

According to the present invention, even though a modified propylene-α-olefin copolymer has a low melting point, it is less sticky, retains crystallinity and can attain high hardness even though it has a polar group. Accordingly, the modified propylene-α-olefin copolymer of the present invention can be suitably used in various applications including coating materials, moldable resin compositions and hot melt compositions.

A coating material containing the modified propylene-α-olefin copolymer of the present invention is excellent in dispersibility and solubility in water or a solvent, is cured at a high speed when applied, and can be increased in concentration. Further, even when the modified propylene-α-olefin copolymer of the present invention is blended with another resin, since superior compatibility is attained, varnish separation can be inhibited, coating unevenness can be reduced, and a coated surface of the coating material can be provided with blocking resistance. Therefore, a resin solution can be spray coated without causing a separation phenomenon, and hence it is useful for a paint, a primer, an adhesive and a binder for an ink that can be spray-coated. Furthermore, when the coating material is used for forming a coated film, the coated film is free from surface stickiness and exhibits excellent adhesiveness to various molded products and the like, and therefore, it is used in various fields including an industrial material field and a building material field as a coating material, a paint, a primer, an adhesive, a pressure-sensitive adhesive, a binder for an ink, and the like to be applied on a plastic, a metal, paper, wood, fiber, leather, glass, a rubber, a ceramic, concrete and the like. Further, the modified propylene-α-olefin copolymer of the present invention is also used as a filler dispersant or a pigment dispersant in the above-described coating material, a sintering aid, or a binder of ceramics or a metallurgical formulation.

A moldable resin composition containing the modified propylene-α-olefin copolymer of the present invention is excellent in balance among mechanical characteristics such as impact strength, bending strength and tensile strength.

A hot melt composition containing the modified propylene-α-olefin copolymer of the present invention is excellent in a flowability and is highly adhesive to a base material because the modified propylene-α-olefin copolymer has excellent compatibility with a base polymer or a tackifying resin.

DESCRIPTION OF EMBODIMENTS

1. Method for Producing Modified Propylene-α-Olefin Copolymer (A)

A modified propylene-α-olefin copolymer (A) of the present invention can be a propylene-α-olefin copolymer containing a polar group structural unit in a prescribed ratio. The polar group preferably contains a hetero atom. More specifically, the polar group contains carbon, hydrogen or oxygen in a preferred aspect, and further specifically, examples of the polar group include ester group, ether group, carboxylic acid group (including carboxylic acid anhydride group), aldehyde group and ketone group.

The modified propylene-α-olefin copolymer (A) of the present invention can be produced by steps of 1) obtaining a low molecular weight propylene-α-olefin copolymer (A1) by thermally decomposing a propylene-$C_{4+}$ α-olefin copolymer (A2); and 2) obtaining the modified propylene-α-olefin copolymer (A) by graft polymerizing the low molecular weight propylene-α-olefin copolymer (A1) with a polar compound having a double bond.

Step 1)

The propylene-$C_{4+}$ α-olefin copolymer (A2) is thermally decomposed to obtain the low molecular weight propylene-α-olefin copolymer (A1).

Examples of a method for thermally decomposing the propylene-$C_{4+}$ α-olefin copolymer (A2) include a method in which the propylene-$C_{4+}$ α-olefin copolymer (A2) is supplied to an extruder under an inert atmosphere of nitrogen or the like to be thermally decomposed while heating, kneading and extruding; a method in which the propylene-$C_{4+}$ α-olefin copolymer (A2) is supplied to an extruder with a tubular reactor connected at a subsequent stage, so as to be continuously thermally decomposed in the tubular reactor; and a method in which the propylene-$C_{4+}$ α-olefin copolymer (A2) is charged in a thermal decomposition reactor to be thermally decomposed with stirring in a batch method.

A temperature at which the propylene-$C_{4+}$ α-olefin copolymer (A2) is thermally decomposed is preferably 300 to 450° C., more preferably 350 to 430° C., and particularly preferably 370 to 410° C. A time for performing the thermal decomposition can be preferably 5 minutes to 10 hours, and more preferably 10 minutes to 90 minutes. When the time of the thermal decomposition is longer and/or the temperature is higher, the molecular weight can be reduced and the number of vinylidene groups can be increased.

The obtained propylene-α-olefin copolymer (A1) may be purified by, for example, a solvent fractionation method for fractionating in accordance with a difference in solubility in organic solvents. The propylene-$C_{4+}$ α-olefin copolymer (A2) used as the raw material will be described later.

<Propylene-α-Olefin Copolymer (A1)>

The propylene-α-olefin copolymer (A1) contains a propylene-derived constituent unit (a) in an amount of 60 to 95 mol %, preferably 60 to 90 mol %, more preferably 65 to 88 mol %, further preferably 70 to 85 mol %, and particularly preferably 75 to 82 mol %; and a $C_{4+}$ α-olefin-derived constituent unit (b) in an amount of 5 to 40 mol %, preferably 10 to 40 mol %, more preferably 12 to 35 mol %, further preferably 15 to 30 mol %, and particularly preferably 18 to 25 mol %, in which the total amount of the unit (a) and the unit (b) is 100 mol %.

Specific examples of a $C_{4+}$ α-olefin constituting the propylene-α-olefin copolymer (A1) include 1-butene, 1-hexene, 4-methyl-1-pentene, 1-octene and 1-decene, and a $C_{4-10}$ α-olefin is preferred, a $C_{4-8}$ α-olefin is more preferred, and 1-butene is particularly preferred.

The propylene-α-olefin copolymer (A1) may further contain, as another olefin in addition to propylene and the $C_{4+}$ α-olefin, a constituent unit derived from ethylene or the like in a small amount, for example, 10 mol % or less with respect to 100 mol % of the total amount of the units (a) and (b). On the other hand, an aspect where a constituent unit derived from ethylene is not contained is one of preferable aspects from the viewpoint of solubility and dispersibility of a coating material and blocking resistance of a coated film attained by using a modified product thereof as the coating material.

The propylene-α-olefin copolymer (A1) may further contain, in an amount of 10 mol % or less with respect to 100 mol % of the total amount of the units (a) and (b), a constituent unit derived from an olefin polymerizable monomer other than α-olefin, for example, vinyl acetate; an unsaturated carboxylic acid such as acrylic acid or methacrylic acid; an unsaturated carboxylate such as methyl acrylate, ethyl acrylate, isobutyl acrylate, n-butyl acrylate, 2-ethylhexyl acrylate, methyl methacrylate, glycidyl methacrylate or dimethyl maleate; or styrene. From the viewpoint of the hardness of the propylene-α-olefin copolymer (A), however, it is preferable that such a monomer is not contained.

The contents of the propylene-derived constituent unit and the $C_{4+}$ α-olefin-derived constituent unit in the propylene-α-olefin copolymer (A1) can be obtained by analysis of a $^{13}C$-NMR spectrum.

(Weight Average Molecular Weight Mw)

The propylene-α-olefin copolymer (A1) may have the upper limit of a weight average molecular weight (Mw) measured by GPC of 40,000, preferably 30,000, more preferably 20,000, and particularly preferably 10,000. The propylene-α-olefin copolymer (A1) may have the lower limit of the weight average molecular weight (Mw) of 3,000, preferably 5,000, more preferably 6,000, and particularly preferably 8,000 (requirement (i)).

When the weight average molecular weight (Mw) falls in the above-described range, it is presumed that a coating material containing a modified product of the propylene-α-olefin copolymer (A1) can be further increased in concentration and is excellent in handleability. Further, a resultant coated film is uniform, is excellent in blocking resistance, and has superior adhesiveness to a base material. When the weight average molecular weight (Mw) is equal to or lower than the upper limit, the solubility and the dispersibility of the modified product of the propylene-α-olefin copolymer (A1) in an organic solvent or in a resin used together are excellent, and hence, the viscosity of the coating material containing the copolymer can be appropriate, so that the concentration can be further increased and the superior handleability can be retained. Furthermore, a uniform coated film having less unevenness and streaks may be obtained for similar reasons.

Moreover, although a detailed reason is not clear, when the weight average molecular weight (Mw) of the propylene-α-olefin copolymer (A1) is equal to or lower than the upper limit, it is presumed that the modified product is easily crystallized, and hence is cured at a high speed in a drying step, probably resulting in attaining blocking resistance. Further, when the weight average molecular weight (Mw) of the propylene-α-olefin copolymer (A1) is equal to or lower than the upper limit, it is presumed that the coated film containing the modified product can easily follow a base material or that shrinkability of the coated film can be suppressed to increase its adhesiveness to the base material. On the other hand, when the weight average molecular weight (Mw) of the propylene-α-olefin copolymer (A1) is equal to or higher than the lower limit, a sticky component otherwise produced due to a low molecular weight is reduced, and the coated film containing the modified product is presumed to attain superior blocking resistance. In general, an olefin of the propylene-α-olefin copolymer (A1) having a low molecular weight contains a sticky component in a large amount, and is regarded to be difficult to handle when it is in the shape of a coated film, but when the weight average molecular weight (Mw) is set within the above-described range, a coated film containing the modified product thereof is presumed to have excellent blocking resistance.

[Mw/Mn]

An Mw/Mn of the propylene-α-olefin copolymer (A1) measured by the GPC is not especially limited, and is, for example, about 1 to 5, and preferably about 2 to 4. When the Mw/Mn falls in the above-described range, a coating material containing a modified product of the propylene-α-olefin copolymer (A1) is highly stable, and can be excellent in balance between the blocking resistance of the coated film and adhesiveness to a base material. For example, when the Mw/Mn of the propylene-α-olefin copolymer (A1) is 1.1 to 3.0 or preferably 2.0 to 3.0, a coated film containing the modified product tends to have higher blocking resistance. When the Mw/Mn of the propylene-α-olefin copolymer (A1) is higher than 3.0, preferably about 3.1 to 5.0, and more preferably about 3.1 to 4.0, affinity of the modified product with another resin, a filler or an additive used in the coating material is excellent, and the coating material is excellent in stability. Further, the resultant coated film tends to be excellent in the adhesiveness to a base material.

The weight average molecular weight (Mw) of the propylene-α-olefin copolymer (A1) can be measured by the GPC. The GPC measurement can be performed under conditions described below. Further, the weight average molecular weight (Mw) and the number average molecular weight (Mn) can be obtained on the basis of a conversion method described below with a calibration curve created by using a commercially available monodisperse standard polystyrene.

[Measurement Conditions]

Apparatus: gel permeation chromatograph, Alliance GPC2000 (manufactured by Waters)

Organic solvent: o-dichlorobenzene

Columns: two TSKgel GMH6-HT columns and two TSKgel GMH6-HTL columns (both manufactured by Tosoh Corporation)

Flow rate: 1.0 ml/min

Sample: 0.15 mg/mL o-dichlorobenzene solution

Temperature: 140° C.

Molecular weight conversion: PP conversion/general-purpose calibration

Incidentally, for calculation of the general-purpose calibration, coefficients of Mark-Houwink viscosity equation can be used. As the Mark-Houwink coefficients for PS and PP, values described in literatures (J. Polym. Sci., Part A-2, 8, 1803 (1970), and Makromol. Chem., 177, 213 (1976) can be used.

[Melting Point (Tm)]

A melting point (Tm) obtained based on a result of DSC of the propylene-α-olefin copolymer (A1) is 60 to 110° C., preferably 60 to 90° C., more preferably 65 to 85° C., and particularly preferably 70 to 80° C. (requirement (ii)). When the melting point (Tm) falls in the above-described range, a modified product of the propylene-α-olefin copolymer (A1) is excellent in the balance among the solubility and the dispersibility in an organic solvent or a resin used together, the blocking resistance and the adhesiveness to a base material.

The melting point (Tm) of the propylene-α-olefin copolymer (A1) can be measured by using DSC-20 (manufactured by Seico Electronics Industrial Co., Ltd.) by DSC (differential scanning calorimetry). A temperature of an endothermic peak in a curve, which is obtained by increasing a temperature of about 10 mg of a sample from −20° C. to 200° C. at 10° C./min, can be obtained as the melting point. Preferably, an operation of increasing the temperature of the sample (a copolymer) up to about 200° C., retaining the temperature for 5 minutes and then lowering the temperature to −20° C. at 10° C./min is once performed before the above-described measurement with the temperature increased, so as to unify the heat history of the samples (the copolymer).

The melting point of the modified propylene-α-olefin copolymer (A) can be controlled in accordance with the content of the $C_{4+}$ α-olefin, production conditions (the type of a catalyst in particular) of the propylene-$C_{4+}$ α-olefin copolymer (A2) before the thermal decomposition, and the like. In order to lower the melting point of the modified propylene-α-olefin copolymer (A), it is preferable, for example, to increase the proportion of the $C_{4+}$ α-olefin or to use a metallocene catalyst as the catalyst used in the production of the propylene-$C_{4+}$ α-olefin copolymer (A2) before the thermal decomposition.

[Crystallization Temperature (Tc)]

A crystallization temperature (Tc) obtained based on the result of the DSC of the propylene-α-olefin copolymer (A1) is 20 to 80° C., preferably 30 to 70° C., more preferably 39 to 65° C., and particularly preferably 40 to 55° C. When the crystallization temperature (Tc) falls in the above-described range, a modified product of the propylene-α-olefin copolymer (A1) is excellent in the balance among the solubility and the dispersibility in an organic solvent or a resin used together, the blocking resistance and the adhesiveness to a base material.

The crystallization temperature (Tc) of the propylene-α-olefin copolymer can be measured by using DSC-20 (manufactured by Seico Electronics Industry Co., Ltd.) by the DSC (differential scanning calorimetry). An operation of increasing a temperature of about 10 mg of a sample up to about 200° C., retaining the temperature for 5 minutes and lowering the temperature to −20° C. at 10° C./min is performed. A temperature of an endothermic peak in a curve thus created can be obtained as the crystallization temperature.

[Half Width of Melting Point Peak]

A half width of a melting point peak measured by the DSC of the propylene-α-olefin copolymer (A1) is 1 to 20° C., preferably 5 to 20° C., more preferably 7 to 20° C., and particularly preferably 10 to 15° C. (requirement (iii)).

When the half width of the melting point peak falls in the above-described range, a modified product of the propylene-α-olefin copolymer (A1) is superior in the solubility and the dispersibility in an organic solvent or a resin used together, and the stability of a coating material containing the copolymer is also superior. Further, there is a tendency that the coating material is cured at a high speed and has excellent blocking resistance. It is also presumed that the propylene-α-olefin copolymer (A1) having the half width of the melting point peak obtained based on a result of the DSC falling in the above-described range means that a distribution of the α-olefin in the copolymer is uniform.

In particular, when the half width is higher than the upper limit, a modified product of the propylene-α-olefin copolymer (A1) is presumed to have both of a portion where the α-olefin is densely present and a portion where it is sparsely present, and the portion where the α-olefin is densely present may cause the stickiness, and the degradation of the blocking resistance in some cases.

On the other hand, when the half width is lower than the lower limit, a modified product of the propylene-α-olefin copolymer (A1) has a narrow composition distribution, and hence cannot always exhibit superior compatibility with a resin or a filler used together in a coating material, and therefore, it is presumed that the solubility and the dispersibility tend to be inferior.

The half width can be obtained as a peak width (° C.) in a position corresponding to a half height from the base line of the whole endothermic peak obtained by the DSC to the endothermic peak top.

[Heat of Fusion (ΔH)]

Heat of fusion (ΔH) obtained based on a result of the DSC of the propylene-α-olefin copolymer (A1) can be 40 to 100 J/g, more preferably 45 to 80 J/g, further preferably 45 to 70 J/g, and most preferably 45 to 60 J/g.

A modified product of the propylene-α-olefin copolymer (A1) having the ΔH falling in the above-described range is excellent in the balance among the solubility and the dispersibility in an organic solvent or a resin used together, the stability and the blocking resistance of the coated film. Further, the modified product of the propylene-α-olefin copolymer (A1) can attain high hardness although it has a comparatively low melting point (Tm) obtained based on the result of the DSC, and therefore, is particularly excellent in the balance among the solubility, the dispersibility and the blocking resistance when used in a coating material or the like. The reason is not clear, but is presumed because the modified product of the propylene-α-olefin copolymer (A1)

has unexpectedly large ΔH at the melting peak although the melting point (Tm) obtained based on the result of the DSC is comparatively low.

The heat of fusion (ΔH) can be obtained by calculating, as the heat of fusion (ΔH) (J/g), an area partitioned by the endothermic peak obtained by the DSC and the base line of the whole endothermic peak.

When the propylene-α-olefin copolymer (A1) satisfying the aforementioned requirements (i) to (iii) is used as the raw material, it is regarded that a modified propylene-α-olefin copolymer (A) satisfying requirements (i") to (iii") described later can be easily obtained.

The requirements (i) to (iii) of the propylene-α-olefin copolymer (A1) can be controlled in accordance with the physical properties of the propylene-$C_{4+}$ α-olefin copolymer (A2) before the thermal decomposition, such as the type of a catalyst used in producing the propylene-$C_{4+}$ α-olefin copolymer (A2). In order to satisfy the requirements (i) to (iii) of the propylene-α-olefin copolymer (A1), it is preferable, for example, to use the propylene-$C_{4+}$ α-olefin copolymer (A2) before the thermal decomposition produced by using a metallocene catalyst.

[Number of Vinylidene Groups]

The number of vinylidene groups per 1,000 carbon atoms, measured by $^1$H-NMR, of the propylene-α-olefin copolymer (A1) is preferably 0.5 to 5 (requirement (iv)).

Since the propylene-α-olefin copolymer (A1) is obtained by the thermal decomposition as described above, it can contain a larger number of vinylidene groups in molecular end portions than a polymer obtained by directly polymerizing monomers. Specifically, as for the number of vinylidene groups corresponding to unsaturated end groups of the propylene-α-olefin copolymer (A1), for example, the number of vinylidene groups per 1,000 carbon atoms measured by the $^1$H-NMR is preferably 0.5 to 5/1,000 carbon atoms, more preferably 1 to 4/1,000 carbon atoms, and particularly preferably 2 to 3.5/1,000 carbon atoms. Incidentally, since a polymer obtained by directly polymerizing monomers attains a desired molecular weight while suppressing molecular weight increase by allowing a large amount of hydrogen to coexist during the polymerization, the number of vinylidene groups in the thus obtained propylene-α-olefin copolymer (A1) is small.

The number of vinylidene groups in the propylene-α-olefin copolymer (A1) can be controlled in accordance with the conditions for the thermal decomposition. For example, in order to increase the number of vinylidene groups, it is preferable to increase the degree of the thermal decomposition, namely, to increase a thermal decomposition ratio (i.e., Mw before the thermal decomposition/Mw after the thermal decomposition). When the number of vinylidene groups of the propylene-α-olefin copolymer (A1) falls in the above-described range, a modified product of the propylene-α-olefin copolymer (A1) is excellent in the affinity with another resin, a filler, or an additive used together in, for example, a coating material, and the coating material containing the modified product attains superior stability. Further, a coated film obtained by using it is excellent in the adhesiveness to a base material.

The number of vinylidene groups of the propylene-α-olefin copolymer (A1) can be measured by the $^1$H-NMR. For the $^1$H-NMR, a nuclear magnetic resonance spectrometer JNM-ECX400P manufactured by JEOL Ltd. is used for performing the measurement at 120° C. after completely dissolving 20 mg of a sample in about 0.5 ml of deuterated o-dichlorobenzene in an NMR sample tube (5 mmφ). The number of vinylidene groups can be calculated by substituting, into the following equation, a peak integrated intensity (C) corresponding to two protons derived from a vinylidene group observed in the vicinity of 4.7 ppm when the total integrated intensities of signals derived from the propylene-α-olefin copolymer (A1) are normalized to 2,000:

Number $L$ of vinylidene groups(/1,000 carbon atoms)=$C/2$.

[Degree of Crystallinity]

The degree of crystallinity measured by X-ray diffraction analysis of the propylene-α-olefin copolymer (A1) is preferably 40 to 70%, more preferably 45 to 65%, and particularly preferably 50 to 58%. When the degree of crystallinity of the propylene-α-olefin copolymer (A1) is higher than the above-described lower limit, a component corresponding to the cause of stickiness is reduced, and therefore, a coated film containing a modified product thereof can attain superior blocking resistance. When the degree of crystallinity is lower than the upper limit, the amount of a crystalline component derived from the propylene-α-olefin copolymer (A1) that is regarded to inhibit the solubility and the dispersibility of a coating material is reduced, and hence, the stability and the coatability of the coating material are regarded to be improved.

The degree of crystallinity of the propylene-α-olefin copolymer (A1) can be measured by the following method. A pressed sheet with a thickness of 1 mm is produced by heating a measurement sample by hot press at 180° C. for 5 minutes and then cooling the resultant with water by cold press for 5 minutes. The thus obtained pressed sheet is measured for a wide angle X-ray diffraction profile by using an X-ray diffractometer (RINT2500 manufactured by Rigaku Corporation) equipped with a rotatable sample holder under conditions of Cu-Kα radiation and 50 kV-300 mA by a transmission method with a 2θ angle set to a range of 5° to 35°. In the thus obtained X-ray diffraction profile, a crystal-derived portion and a non-crystal derived portion are separated to obtain the degree of crystallinity on the basis of a diffraction intensity ratio therebetween.

The propylene-α-olefin copolymer (A1) can be not only used as the raw material of the modified propylene-α-olefin copolymer (A) of the present invention but also used as it is for various applications. For example, the propylene-α-olefin copolymer (A1) can be used for various applications such as a coating material, a paint, a primer, a moldable resin composition, a resin modifier, a hot melt adhesive composition, an adhesive, a pressure-sensitive adhesive, a heat sealing agent, a binder for an ink, a filler dispersant or pigment dispersant contained in a paint, a binder for ceramics or a metallurgical formulation, an anti-wear agent for a printing ink, a surface coating agent, an additive for a thermal transfer recording medium, a non-woven fabric modifier, a tonner additive, a glazing agent, a mold releasing agent for resin molding, a rubber processing aid, a paper quality improver, a fiber processing aid, an electrical insulating agent, a compounding agent of a natural wax, an anti-fogging agent for a polyolefin film, a pigment dispersant (masterbatch), a molding aid, an antioxidant for rubber, a paper coating, a fiber finishing agent, a lubricant for PVC, an additive for asphalt, a nucleating agent for expanded polystyrene, lost wax, a sintering aid, and a component of a candle.

<Propylene-α-Olefin Copolymer (A2)>

The propylene-α-olefin copolymer (A2) is preferably a propylene-$C_{4+}$ α-olefin copolymer.

Specific examples of a $C_{4+}$ α-olefin constituting the propylene-$C_{4+}$ α-olefin copolymer (A2) include 1-butene, 1-hexene, 4-methyl-1-pentene, 1-octene and 1-decene, and a $C_{4-10}$ α-olefin is preferred, a $C_{4-8}$ α-olefin is more preferred, and 1-butene is particularly preferred. Further, the propylene-$C_{4+}$ α-olefin copolymer (A2) may further contain, as another olefin in addition to propylene and the $C_{4+}$ α-olefin, a constituent unit derived from ethylene or the like in a small amount, for example, 10 mol % or less. On the other hand, an aspect where a constituent unit derived from ethylene is not contained is one of preferable aspects.

The propylene-$C_{4+}$ α-olefin copolymer (A2) contains a propylene-derived constituent unit (a') in an amount of 60 to 95 mol %, preferably 60 to 90 mol %, more preferably 65 to 88 mol %, further preferably 70 to 85 mol %, and particularly preferably 75 to 82 mol %; and a $C_{4+}$ α-olefin-derived constituent unit (b') in an amount of 5 to 40 mol %, preferably 10 to 40 mol %, more preferably 12 to 35 mol %, further preferably 15 to 30 mol %, and particularly preferably 18 to 25 mol %, in which the total amount of the unit (a') and the unit (b') is 100 mol %, and satisfies the following requirements:

(i') a weight average molecular weight (Mw) measured by the GPC of 50,000 to 1,000,000, preferably 70,000 to 800,000, and more preferably 100,000 to 600,000;

(ii') a melting point (Tm) measured by the DSC of 60 to 120° C., preferably 65 to 100° C., and more preferably 70 to 90° C.; and (iii') a half width of a melting point peak measured by the DSC of 1 to 20° C., preferably 2 to 18° C., more preferably 3 to 15° C., and further preferably 4 to 12° C.

Measurement methods for the weight average molecular weight, the melting point (Tm) and the half width of a melting point peak can be respectively the same as the above-described measurement methods for the weight average molecular weight, the melting point (Tm) and the half width of a melting point peak.

The ΔH at a melting peak measured by the DSC of the propylene-$C_{4+}$ α-olefin copolymer (A2) is preferably 30 to 100 J/g, more preferably 35 to 75 J/g, further preferably 35 to 65 J/g, and particularly preferably 40 to 55 J/g. A measurement method for the ΔH at a melting peak can be the same as the above-described measurement method for the ΔH at a melting peak.

A density measured by a density gradient tube method according to JIS K7112 of the propylene-$C_{4+}$ α-olefin copolymer (A2) is preferably 850 to 910 kg/m$^3$.

A molecular weight distribution (Mw/Mn) obtained by the gel permeation chromatography (GPC) of the propylene-$C_{4+}$ α-olefin copolymer (A2) is typically 3 or less, preferably 1.8 to 3.0, and more preferably 1.9 to 2.5. A measurement method for the molecular weight distribution (Mw/Mn) can be the same as the above-described measurement method for the molecular weight distribution (Mw/Mn).

In a copolymer obtained by the thermal decomposition of a propylene-α-olefin copolymer not satisfying the above-described requirements (i') to (iii'), the half width at a melting peak measured by the DSC tends to be large, and may exceed 20° C. in some cases. Further, the ΔH at a melting peak measured by the DSC may be small in such a copolymer in some cases, and may be, for example, smaller than 40 J/g in some cases.

In contrast, in the copolymer (A1) obtained by the thermal decomposition of the propylene-$C_{4+}$ α-olefin copolymer (A2) satisfying the above-described requirements (i') to (iii'), the half width measured by the DSC is not large, and is, for example, 1 to 20° C. Further, the ΔH at a melting peak measured by the DSC tends to be large and be, for example, 40 to 100 J/g.

In addition, in the copolymer (A2) having a small half width, for example, a difference in the amount of the α-olefin is small among molecules, and therefore, it is presumed that a difference in the amount of the α-olefin is small among molecules in the copolymer (A1) obtained by the thermal decomposition of the copolymer (A2). Accordingly, it is presumed that the crystallinity of the copolymer (A1) obtained by the thermal decomposition of the copolymer (A2) does not become easily decrease. To the contrary, the crystallinity may be increased through the thermal decomposition in some cases.

On the other hand, in a copolymer having a large half width beyond, for example, 20° C., there is a large difference in the amount of the α-olefin among molecules, for example, and hence, a molecule containing a large amount of the α-olefin is regarded to be easily thermally decomposed. Therefore, in a copolymer obtained by the thermal decomposition of this copolymer, it is presumed that a component having an extremely low molecular weight and containing a comparatively large amount of the α-olefin is partially produced. Such a component is inferred to have a function to lower the crystallinity of a polymer to be produced.

The propylene-$C_{4+}$ α-olefin copolymer (A2) can be produced by any of various known production methods, such as a high pressure method and a method using a Ziegler catalyst or a metallocene catalyst. Specifically, any of known catalysts, such as: magnesium-supported titanium catalysts described in Japanese Patent Application Laid-Open Nos. 57-63310, 58-83006 and 3-706, Japanese Patent No. 3476793, and Japanese Patent Application Laid-Open Nos. 4-218508 and 2003-105022; and metallocene catalysts described in International Publication Nos. 01/53369, 01/27124 and 2004/087775, and Japanese Patent Application Laid-Open Nos. 3-193796 and 02-41303, can be suitably used.

Among these catalysts, a metallocene-based catalyst is preferably used for the production because the propylene-α-olefin copolymer (A1) having a low melting point and a uniform molecular weight distribution can be easily obtained from the propylene-$C_{4+}$ α-olefin copolymer (A2) by using the catalyst.

Step 2)

The modified propylene-α-olefin copolymer (A) is obtained by graft polymerizing a polar compound having a double bond with the propylene-α-olefin copolymer (A1) obtained in step 1) described above.

<Polar Compound Having Double Bond>

The polar compound having a double bond is preferably at least one selected from unsaturated carboxylic acids and derivatives thereof and unsaturated sulfonic acids and salts thereof. Specific examples include unsaturated carboxylic acids such as acrylic acid, methacrylic acid, α-ethyl acrylate, maleic acid, fumaric acid, itaconic acid, citraconic acid, tetrahydrophthalic acid, methyl tetrahydrophthalic acid, and endosis-bicyclo [2,2,1]hept-5-ene-2,3-dicarboxylic acid (nadic acid [trademark]); derivatives of these such as acid halides, amides, imides, acid anhydrides and esters of these; and unsaturated sulfonic acids such as styrene sulfonic acid, allyl sulfonic acid, 2-(meth)acrylamide-2-methylpropane sulfonic acid, (meth)acrylamide propane sulfonic acid, sulfopropyl (meth)acrylate, (meth)acryloyloxy naphthalene sulfonic acid and vinyl sulfonic acid, and salts of these. Among these, an unsaturated dicarboxylic acid or an acid anhydride thereof is suitably used, and maleic acid, nadic acid (trademark) or an acid anhydride thereof is particularly suitably used.

A particularly preferable example of the polar compound having a double bond is maleic anhydride. There is a tendency that the maleic anhydride has comparatively high reactivity with the propylene-α-olefin copolymer (A1) described above, is not largely changed in its own structure through polymerization or the like, and is stable as a basic structure. Therefore, it has an advantage that a modified propylene-α-olefin copolymer (A) with stable quality can be easily obtained.

<Graft Modification>

The modified propylene-α-olefin copolymer (A) of the present invention can be obtained by graft modifying the propylene-α-olefin copolymer (A1) with the polar compound having a double bond corresponding to a polar group structural unit, as described above.

The graft modification of the propylene-α-olefin copolymer (A1) can be performed by a known method. An example of the method is a method in which the propylene-α-olefin copolymer (A1) is dissolved in an organic solvent, then, a polar compound having a double bond, such as an unsaturated carboxylic acid, and a radical initiator and the like are added to the thus obtained solution, and the resultant is reacted typically at 60 to 350° C., preferably at 80 to 190° C. for 0.5 to 15 hours, preferably 1 to 10 hours.

As the organic solvent, any organic solvent can be used without any restriction as long as it can dissolve the propylene-α-olefin copolymer. Examples of such an organic solvent include aromatic hydrocarbon-based solvents such as benzene, toluene and xylene; and aliphatic hydrocarbon-based solvents such as pentane, hexane and heptane.

Another example of the graft modification method includes a method in which the propylene-α-olefin copolymer (A1) and the polar compound having a double bond such as an unsaturated carboxylic acid are reacted with each other by using an extruder or the like preferably without using a solvent. As reaction conditions employed in this case, a reaction temperature can be typically a temperature equal to or higher than the melting point of the propylene-α-olefin copolymer (A1), specifically 100 to 350° C. A reaction time can be typically 0.5 to 10 minutes.

In order to efficiently graft copolymerize the polar compound having a double bond, the reaction is preferably conducted in the presence of a radical initiator.

Examples of the radical initiator include organic peroxides and organic peresters such as benzoyl peroxide, dichlorobenzoyl peroxide, dicumyl peroxide, di-t-butyl peroxide, 2,5-dimethyl-2,5-di(peroxide benzoate)hexyne-3,1,4-bis(t-butylperoxy isopropyl)benzene, lauroyl peroxide, t-butyl peracetate, 2,5-dimethyl-2,5-di(t-butylperoxy)hexyne-3,2,5-dimethyl-2,5-di(t-butylperoxy)hexane, t-butyl benzoate, t-butyl perphenyl acetate, t-butyl perisobutyrate, t-butyl per-sec-octoate, t-butyl perpivalate, cumyl perpivalate, and t-butyl perdiethyl acetate; and azo compounds such as azobisisobutyronitrile and dimethyl azoisobutyrate. Among these, dialkyl peroxides such as dicumyl peroxide, di-t-butyl peroxide, 2,5-dimethyl-2,5-di(t-butylperoxy)hexyne-3,2,5-dimethyl-2,5-di(t-butylperoxy)hexane, and 1,4-bis(t-butylperoxy isopropyl)benzene are preferred. The radical initiator is used typically in a ratio of 0.001 to 1 part by weight based on 100 parts by weight of the propylene-α-olefin copolymer (A1) before the modification.

In the present invention, the propylene-α-olefin copolymer (A1), that is, a thermally decomposed product of the copolymer (A2) containing the propylene unit and the $C_{4+}$ α-olefin unit, is graft modified. It is regarded, as described above, that the propylene-α-olefin copolymer (A1) mainly contains "molecules having vinylidene groups in end portions" produced by main chain cleavage; and further contains not only the "molecules having highly reactive vinyl groups in end portions" but also "molecules having lowly reactive internal double bonds in the end portions". In addition, it is regarded that the propylene-α-olefin copolymer (A1) corresponding to the thermally decomposed product containing the propylene unit and the $C_{4+}$ α-olefin unit has a higher probability of forming the "internal double bond" and a lower probability of forming the "vinyl group" than a thermally decomposed product of a homopolypropylene wax (PP wax) or a thermally decomposed product of a propylene ethylene wax (PER wax). Accordingly, it is presumed that crosslinking reactions derived from vinyl groups present in the molecular end portions can be inhibited during the graft modification reaction, so that the viscosity increase can be reduced.

<Modified Propylene-α-Olefin Copolymer (A)>

[Mw]

The upper limit of a weight average molecular weight (Mw) measured by the GPC of the modified propylene-α-olefin copolymer (A) can be 50,000, preferably 40,000, more preferably 25,000, and particularly preferably 18,000; and the lower limit of the weight average molecular weight (Mw) can be 3,000, preferably 5,000, more preferably 8,000, and particularly preferably 12,000.

When the modified propylene-α-olefin copolymer (A) having the weight average molecular weight (Mw) falling in the above-described range is used, the concentration can be further increased, and hence, a coating material excellent in handleability can be obtained. Further, a coated film obtained by using the modified copolymer is uniform, excellent in the blocking resistance and also excellent in the adhesiveness to a base material. When the weight average molecular weight (Mw) is equal to or lower than the upper limit, the modified propylene-α-olefin copolymer (A) is presumed to be excellent in the solubility and the dispersibility in an organic solvent or a resin used together. Therefore, the viscosity of the coating material becomes appropriate, and this is probably because the concentration can be further increased and the superior handleability can be retained. Further, it is presumed that a uniform coated film having merely a little unevenness and streaks can be obtained for similar reasons.

Moreover, although a detailed reason is not clear, when the weight average molecular weight (Mw) is equal to or lower than the upper limit, it is presumed that the modified propylene-α-olefin copolymer (A) can be easily crystallized, and it is surmised that a curing rate in a drying step is increased resulting in attaining blocking resistance. Further, when the weight average molecular weight (Mw) is equal to or lower than the upper limit, it is presumed that a coated film containing the modified propylene-α-olefin copolymer (A) can easily follow a base material, or that shrinkability of the coated film can be suppressed to increase adhesiveness to the base material. On the other hand, when the weight average molecular weight (Mw) is equal to or higher than the lower limit, a sticky component otherwise produced due to a low molecular weight is reduced in the modified propylene-α-olefin copolymer (A), so that superior blocking resistance can be attained. In general, an olefin of the modified propylene-α-olefin copolymer (A) having a low molecular weight contains a sticky component in a large amount, and is regarded to be difficult to handle when it is in the shape of a coated film, but when the weight average molecular weight (Mw) is set to fall in the above-described range, a coated film having excellent blocking resistance can be easily obtained.

[Melting Point (Tm)]

A melting point (Tm) obtained based on a result of the DSC of the modified propylene-α-olefin copolymer (A) can be 55 to 105° C., preferably 60 to 95° C., more preferably 65 to 85° C., and particularly preferably 67 to 80° C. When the melting point (Tm) falls in the above-described range, the modified propylene-α-olefin copolymer (A) is excellent in the balance among the solubility and the dispersibility in an organic solvent or a resin used together, the blocking resistance and the adhesiveness to a base material.

[Crystallization Temperature (Tc)]

A crystallization temperature (Tc) obtained based on a result of the DSC of the modified propylene-α-olefin copolymer (A) can be 15 to 80° C., preferably 25 to 70° C., more preferably 30 to 70° C., and particularly preferably 40 to 50° C. When the crystallization temperature (Tc) falls in the above-described range, the modified propylene-α-olefin copolymer (A) is excellent in the balance among the solubility and the dispersibility in an organic solvent or a resin used together, the blocking resistance and the adhesiveness to a base material.

[Tc(A1)/Tc(A)]

In the modified propylene-α-olefin copolymer (A), the lowering of the crystallinity through the modification tends to be smaller than in a modified product of a propylene-based wax obtained by the direct polymerization. Accordingly, assuming that the crystallization temperature of the propylene-α-olefin copolymer (A1) is Tc(A1) and the crystallization temperature of the modified propylene-α-olefin copolymer (A) is Tc(A), a crystallization temperature ratio Tc(A1)/Tc(A) can be 1.0 to 1.6, preferably 1.0 to 1.5, and particularly preferably 1.1 to 1.3.

When the crystallization temperature ratio Tc(A1)/Tc(A) falls in the above-described range, the modified propylene-α-olefin copolymer (A) is excellent in the balance among the solubility and the dispersibility in an organic solvent or a resin used together, the blocking resistance, a coated film curing time, and the adhesiveness to a base material. Although the reason is not clear, the crystallization temperature ratio Tc(A1)/Tc(A) falling in the above-described range means that the crystallization temperature is merely slightly changed through the modification. In other words, it suggests that the influence of the modification on the crystallinity is small. In general, many of polar group structural units are grafted onto a main chain through the modification, and hence, the crystallinity of the main chains is lowered, and this is presumed to lead to a tendency of lowering of the crystallization temperature. On the contrary, in the modified propylene-α-olefin copolymer (A) of the present invention, many of polar group structural units are regarded to be added to vinylidene groups in molecular end portions or internal double bonds of the propylene-α-olefin copolymer (A1). Accordingly, it is regarded that the lowering of the crystallinity caused through the increase of the amount of modification is small in the modified propylene-α-olefin copolymer (A) of the present invention. This may enable the modified propylene-α-olefin copolymer (A) to exhibit excellent blocking resistance while having excellent solubility and dispersibility in a solvent or water and adhesiveness to a base material. Further, when the modified propylene-α-olefin copolymer (A) of the present invention is used in a coating material such as a primer, it is presumed that the coated film can be cured (crystallized) in a short time.

[Half Width of Melting Point Peak]

A half width of a melting point peak measured by the DSC of the modified propylene-α-olefin copolymer (A) can be 1 to 40° C., preferably 5 to 30° C., more preferably 10 to 25° C., and particularly preferably 12 to 22° C. When the half width of the melting point peak falls in the above-described range, the modified propylene-α-olefin copolymer (A) is excellent in the solubility and the dispersibility in an organic solvent or a resin used together, and when it is used in, for example, a coating material or the like, the stability of the coating material is superior. Further, there is a tendency for the curing rate of the coating material to be high and for the blocking resistance to be excellent.

The modified propylene-α-olefin copolymer (A) having the half width of the melting point peak obtained based on the result of the DSC falling in the above-described range is also presumed to mean that a distribution of the α-olefin in the copolymer is uniform. In particular, when the half width is higher than the upper limit, the modified propylene-α-olefin copolymer (A) is presumed to have both of a portion where the α-olefin is densely present and a portion where it is sparsely present, and the portion where the α-olefin is densely present may cause the stickiness, and the degradation of the blocking resistance. On the other hand, when the half width is lower than the lower limit, the modified propylene-α-olefin copolymer (A) has a narrow composition distribution, and hence cannot always exhibit superior compatibility with a resin or a filler used together in a coating material, and therefore, the solubility and the dispersibility tend to be inferior.

[ΔH of Melting Peak]

Heat of fusion (ΔH) obtained based on a result of the DSC of the modified propylene-α-olefin copolymer (A) can be preferably 20 to 100 J/g, more preferably 25 to 80 J/g, further preferably 30 to 65 J/g, and most preferably 35 to 60 J/g. When the ΔH falls in the above-described range, the modified propylene-α-olefin copolymer (A) is excellent in the balance among the solubility and the dispersibility in an organic solvent or a resin used together, the stability of a coating material containing the copolymer, and the blocking resistance of a coated film formed of the coating material.

Although the melting point (Tm) obtained based on a result of the DSC is comparatively low, the modified propylene-α-olefin copolymer (A) can exhibit high hardness. Therefore, when the modified propylene-α-olefin copolymer (A) is used in, for example, a coating material or the like, the resultant coating material is excellent in the balance among the solubility, the dispersibility and the blocking resistance. Although the reason is not clear, but is presumed because the ΔH at a melting peak is unexpectedly high even though the melting point (Tm) obtained based on the result of the DSC of the modified propylene-α-olefin copolymer (A) is comparatively low.

The Mw, the melting point (Tm), the crystallization temperature (Tc), the half width of a melting point peak, and the ΔH at the melting peak of the modified propylene-α-olefin copolymer (A) can be measured respectively similarly to the above-described methods.

[Acid Value]

An acid value of the modified propylene-α-olefin copolymer (A) is preferably 0.5 to 100 KOHmg/g, more preferably 3 to 65 KOHmg/g, further preferably 5 to 55 KOHmg/g, and particularly preferably 10 to 50 KOHmg/g. The acid value of the modified propylene-α-olefin copolymer (A) can be controlled in accordance with the amount of modification of the propylene-α-olefin copolymer (A1). For example, in order to increase the acid value of the modified propylene-α-olefin copolymer (A), it is preferable to increase the amount of modification of the propylene-α-olefin copolymer (A1). It is presumed that if the ratio of the polar group structural units is a prescribed value or higher, the effects resulting from the modification can be easily sufficiently attained.

The acid value of the modified propylene-α-olefin copolymer (A) corresponds to an amount of potassium hydroxide in mg necessary for neutralizing an acid contained in 1 g of the polymer, and can be measured by a method according to JIS K0070. Specifically, a precisely weighed sample is dissolved in a mixed solvent of mixed xylene and n-butanol in a mass ratio of 1:1 to obtain a sample solution. Then, the sample solution is titrated with a standardized beforehand N/10 potassium hydroxide solution in alcohol (obtained by adding 5 g of ion-exchanged water to 7 g of special grade potassium hydroxide, adding primary ethyl alcohol to the resultant to give a volume of 1 L, and standardizing the titer F by using N/10 hydrochloric acid and a 1% phenolphthalein solution), and the acid value can be calculated based on the resultant neutralization amount in accordance with the following equation:

$$\text{Acid value(mgKOH/g)} = (N/10 \text{ KOH titer(ml)} \times F \times 5.61)/(\text{sample(g)} \times 0.01).$$

Since the modified propylene-α-olefin copolymer (A) is obtained from the propylene-α-olefin copolymer (A1) obtained by the thermal decomposition, many of the polar group structural units are regarded to be added to vinylidene groups in molecular end portions or internal double bonds of the propylene-α-olefin copolymer (A1). Accordingly, the lowering of the crystallization temperature of the modified propylene-α-olefin copolymer (A) through the increase of the amount of modification is regarded to be small as described above.

[Penetration]

Penetration of the modified propylene-α-olefin copolymer (A) is preferably 8 dmm or less, more preferably 5 dmm or less, and particularly preferably 3 dmm or less from the viewpoint of the blocking resistance and the like.

The penetration of the modified propylene-α-olefin copolymer (A) can be measured by the following method. In accordance with JIS K2207, a sample of the modified propylene-α-olefin copolymer (A) melted, while avoiding partial superheating and bubble forming, is cured by allowing it to stand still at room temperature of 15 to 30° C. for 1 to 1.5 hours. Thereafter, the resultant is kept at 25° C. in a thermostat, and after the temperature is stabilized, a depth in a surface portion of the sample where a specified needle enters in 5 seconds is obtained as the penetration (dmm).

In this manner, in the modified propylene-α-olefin copolymer (A) of the present invention, there is tendency that the lowering of the crystallization temperature is small even if the amount of modification is increased. This may enable a coated film formed of a coating material such as a primer can be cured (crystallized) in a short time when the coating material contains the modified propylene-α-olefin copolymer (A).

[Half Crystallization Time]

A half crystallization time of the modified propylene-α-olefin copolymer (A) is not especially limited, and is typically 2,000 seconds or less, preferably 1,500 seconds or less, more preferably 1,000 seconds or less, particularly preferably 700 seconds or less, and most preferably 550 seconds or less. When the half crystallization time is 2,000 seconds or less, in using the modified propylene-α-olefin copolymer (A) as a coating material, a curing time of a coated film applied on a base material is short, and thus it is excellent in workability. Further, the coated film is excellent in the balance between the blocking resistance and the adhesiveness to the base material.

On the other hand, the half crystallization time is 30 seconds or more, preferably 50 seconds or more, more preferably 70 seconds or more, further preferably 90 seconds or more, and particularly preferably 150 seconds or more, and most preferably 300 seconds or more. When the half crystallization time is 30 seconds or more, the coatability can be prevented from degrading due to the occurrence of streaks and unevenness when coated on a base material. Further, the adhesiveness of the obtained coated film to the base material is not easily impaired. The reason is not clear but is probably because, when the half crystallization time is too short, the leveling property is degraded in drying the coated film, and hence, the adhesion of the coated film to the base material becomes non-uniform to degrade the adhesiveness of the coated film.

The half crystallization time can be measured by the following method.

A differential scanning calorimeter (DSC7, manufactured by PerkinElmer) is used, and about 5 mg of a sample is set and completely melted by allowing it to stand still at 200° C. for 5 minutes. Thereafter, the sample is rapidly cooled to 50° C. at a temperature lowering rate of 320° C./min for causing isothermal crystallization. A time elapsing from the start of the cooling until heat of the crystallization reaches a half of the total calorific value is defined as the half crystallization time.

The half crystallization time can be controlled by the amount of α-olefin or an acid to be introduced.

Since the modified propylene-α-olefin copolymer (A) is obtained by modifying the propylene-α-olefin copolymer (A1) obtained by the thermal decomposition as described above, many of polar group structural units are regarded to be added to a vinylidene group in molecular end portions or internal double bonds of the propylene-α-olefin copolymer (A1). Accordingly, the modified propylene-α-olefin copolymer (A) is regarded to have a high crystallization rate, and hence the half crystallization time can be shortened.

2. Resin Composition

A resin composition of the present invention contains the modified propylene-α-olefin copolymer (A) of the present invention, and may further contain a second resin (B1) if necessary.

<Second Resin (B1)>

Examples of the second resin (B1) include olefin-based resin, styrene-based resin, polyurethane, polyester, polyamide, polycarbonate, polyvinyl alcohol, polyvinyl acetate, epoxy resin, acrylic resin, rosin resin, alkyd resin, urea resin, melamine resin, phenolic resin, coumarone resin, ketone resin, cellulose-based resin, chlorinated polyolefin, and mixed resins thereof. In particular, from the viewpoint of the compatibility with the modified propylene-α-olefin copolymer (A), an olefin-based resin or a styrene-based resin is preferred, and an olefin-based elastomer or a styrene-based elastomer is particularly preferred. When the resin composition is used as a primer as described later, from the viewpoint of easily attaining adhesiveness to an overcoat layer, polyurethane, an epoxy resin or an acrylic resin is preferred, and an acrylic resin is particularly preferred.

As the olefin-based elastomer, a propylene-based elastomer is preferred. Examples of the propylene-based elastomer include propylene-1-butene copolymer and acid-modified propylene-1-butene copolymer. As the styrene-based elastomer, a block copolymer containing 10 to 60 mol % of styrene unit is preferred, and examples thereof include Tuftec (manufactured by Asahi Kasei Corporation), Septon (manufactured by Kuraray Co., Ltd.) and Kraton (manufactured by Shell). These olefin-based elastomers and styrene-based elastomers are also excellent in the adhesiveness to an olefin-based base material to be coated.

The second resin (B1) may be graft copolymerized with a polar monomer if necessary. Examples of the polar monomer include hydroxyl group-containing ethylenically unsaturated compounds, amino group-containing ethylenically unsaturated compounds, epoxy group-containing ethylenically unsaturated compounds, unsaturated carboxylic acids, anhydrides thereof and derivatives thereof. A vinyl ester compound, and an unsaturated carboxylic acid or an anhydride thereof is preferred for improving the solvent solubility and the adhesiveness to the base material to be coated.

When the second resin (B1) is combined with the modified propylene-α-olefin copolymer (A) of the present invention, the stability and the coatability of a coating material using the resin composition of the present invention, the blocking resistance and the adhesiveness to a base material to be coated of a coated film formed by the resin composition of the present invention can be improved. The detailed mechanism is not clear but is presumed as follows. When the resin composition of the present invention is used, the low molecular weight component of the modified propylene-α-olefin copolymer (A) is compatible with the second resin (B1), and hence the viscosity of the resin is effectively reduced to increase the stability and the coatability of the coating material. It is also presumed that since a property for following the base material to be coated is increased, the adhesiveness to the base material to be coated is improved. Further, a low molecular weight component constructs crystalline forms more easily when forming a coated film, and hence, the curing rate may easily increase. Furthermore, as described later, the end polar groups of the modified propylene-α-olefin copolymer (A) are likely to interact with each other and form pseudo-polymer chains, thereby exhibiting blocking resistance.

A weight ratio between the modified propylene-α-olefin copolymer (A) and the second resin (B1) in the resin composition of the present invention is typically 1/99 to 90/10, preferably 1/99 to 50/50, more preferably 2/98 to 30/70, and further preferably 8/92 to 25/75. When the weight ratio falls in the above-described range, the stability and the coatability of a coating material using the resin composition of the present invention are improved, the blocking resistance and the adhesiveness to a base material of a coated film formed from the present resin composition are improved, as well as the characteristics of the second resin such as the strength and the heat resistance can be satisfactorily retained.

If necessary, the resin composition of the present invention may further contain, as long as the object of the present invention is not impaired, a propylene-α-olefin copolymer (A1), a propylene-$C_{4+}$ α-olefin copolymer (A2), another thermoplastic resin, and additives such as a weathering stabilizer, a heat resistance stabilizer, an antistatic agent, a slipping preventing agent, an antiblocking agent, an anti-fogging agent, a nucleating agent, a lubricant, a pigment, a filler, a dye, a plasticizer, an age resistor, a hydrochloric acid absorber, an antioxidant, and a copper inhibitor.

The resin composition of the present invention can be produced by dry blending or melt blending employing any of various arbitrary methods. As a specific method, for example, a method in which the modified propylene-α-olefin copolymer (A), the second resin (B1) and other arbitrary components are blended simultaneously or in an arbitrary order by using a tumbler, a V-blender, a Nauta mixer, a banbury mixer, a kneading roll, a single- or twin-screw extruder or the like is appropriately employed. Alternatively, the modified propylene-α-olefin copolymer (A), the second resin (B1) and other arbitrary components can be blended by dispersing or dissolving them in an arbitrary solvent once, and drying the resultant by an appropriate method of natural drying, forced drying by heating, or the like.

3. Applications of Modified Propylene-α-Olefin Copolymer (A)

The modified propylene-α-olefin copolymer (A) of the present invention and the resin composition of the present invention can be used for various applications including, for example, a coating material, a moldable resin composition, a hot melt composition, a paint, a primer, an adhesive, a pressure-sensitive adhesive, a sintering aid and the like.

The composition containing the modified propylene-α-olefin copolymer (A) of the present invention to be used for the above-described applications may further contain, as long as the object of the present invention is not impaired, another thermoplastic resin, and additives such as a weathering stabilizer, a heat resistance stabilizer, an antistatic agent, a slipping preventing agent, an antiblocking agent, an anti-fogging agent, a nucleating agent, a lubricant, a pigment, a filler, a dye, a plasticizer, an age resistor, a hydrochloric acid absorber, an antioxidant, a copper inhibitor and the like, if necessary.

3-1. Coating Material

A first coating material of the present invention contains a modified propylene-α-olefin copolymer (A) and water or an organic solvent.

<Modified Propylene-α-Olefin Copolymer (A)>

The modified propylene-α-olefin copolymer (A) can be the modified propylene-α-olefin copolymer (A) of the present invention.

<Organic Solvent>

The organic solvent is not especially limited, and preferably, a single one or two or more selected from aromatic hydrocarbons such as benzene, toluene and xylene; aliphatic hydrocarbons such as hexane, heptane, octane and decane; alicyclic hydrocarbons such as cyclohexane, cyclohexene, methyl cyclohexane and ethyl cyclohexane (incidentally, the aromatic hydrocarbons, the aliphatic hydrocarbons and the alicyclic hydrocarbons are all together designated also as hydrocarbon-based solvents); halogenated hydrocarbons such as trichloroethylene, dichloroethylene and chlorobenzene; alcohol-based solvents such as methanol, ethanol, isopropyl alcohol, butanol, pentanol, hexanol, propanediol and phenol; ketone-based solvents such as acetone, methyl isobutyl ketone, methyl ethyl ketone, pentanone, hexanone, isophorone and acetophenone; cellosolves such as methyl cellosolve and ethyl cellosolve; ester-based solvents such as methyl acetate, ethyl acetate, butyl acetate, methyl propionate and butyl formate; and ether-based solvents such as tetrahydrofuran can be used.

Among these, an organic solvent having a solubility parameter described later falling in a specific range is preferred. Examples of the organic solvent having a solubility parameter falling in a preferable range include aromatic hydrocarbons such as benzene, toluene and xylene; aliphatic hydrocarbons such as hexane, heptane, octane and decane; alicyclic hydrocarbons such as cyclohexane, cyclohexene, methyl cyclohexane and ethyl cyclohexane; $C_{4-12}$ alcohols such as isopropyl alcohol, dodecanol and butanol; $C_{4-12}$ esters such as ethyl acetate, butyl acetate and diethyl phthalate; and pyrrolidones such as N-methylpyrrolidone. The organic solvents can be used singly or in combination. As the organic solvent, a hydrocarbon-based solvent, an alcohol-based solvent or an ester-based solvent is preferred, a hydrocarbon-based solvent or an alcohol-based solvent is more preferred, and from the viewpoint of, e.g., environmental problems, there is a tendency that an aliphatic hydrocarbon or an alicyclic hydrocarbon is preferably used, and methyl cyclohexane or ethyl cyclohexane is particularly preferred.

The solubility parameter (SP value, in $(cal/cm^3)^{1/2}$) of the organic solvent is not especially limited, and the SP value is in the range of preferably 7.0 to 12.0, more preferably 7.2 to 12.0, further preferably 7.5 to 9.5, particularly preferably 7.7 to 9.0, and most preferably 7.7 to 8.5. When the SP value of the organic solvent falls in the above-described range, the solubility and the dispersibility of the modified propylene-α-olefin copolymer (A) in the organic solvent are excellent as well as the stability of the coating material. In particular, when the SP value of the organic solvent is in the range of 7.7 to 8.5, the modified propylene-α-olefin copolymer (A) is easily completely dissolved therein at a normal temperature, and hence, a uniform coated film excellent in dissolution workability can be obtained.

The "solubility parameter (SP value)" is a value described in Polymer Handbook, Fourth Edition (Edited by: Brandrup, J.; Immergut. Edmund H.; Grulke, Eric A.; Abe, Akihiro; Bloch, Daniel R, 1999), WILEY-INTERSCIENCE and the like. Further, the SP value of a mixed solvent is obtained by adding up products SP values and volume fractions of respective solvent components contained in the mixed solvent. Furthermore, the SP value of a single polymer is calculated in accordance with the following SP value calculation formula based on a molecular attraction force G of a constitutional unit constituting the polymer:

$$SP = d\Sigma G / M$$

wherein d indicates a density (g/l) of the single polymer, ΣG indicates a sum of molecular attraction forces in a molecule of the constitutional unit, and M indicates a molecular weight (g/mol) of the constitutional unit.

The modified propylene-α-olefin copolymer (A) may be dispersed or dissolved in a solvent as a coating material. Even when the modified propylene-α-olefin copolymer (A) is in a dispersed state at a temperature lower than 50° C., it is preferably completely dissolved in the organic solvent at a temperature of 50° C. or more, more preferably completely dissolved at a temperature of 40° C. or more and lower than 50° C., and particularly preferably completely dissolved at a temperature of a normal temperature or more and lower than 40° C. When the modified propylene-α-olefin copolymer (A) is in a dissolved state at a low temperature, a superior film forming state can be attained at a low coating temperature.

The copolymer can be coated even if it is in a dispersed state, and in order to attain a superior film forming state, it is necessary in some cases to perform baking at a temperature equal to or higher than the melting point. As the dispersed state, an inhomogeneous state is preferable such that precipitation cannot be visually observed after standing still for 1 day at a concentration of 10 wt % of olefin resin in a methyl cyclohexane medium.

A method for dissolving or dispersing the modified propylene-α-olefin copolymer (A) in water or an organic solvent is not especially limited, and examples thereof include a method in which the modified propylene-α-olefin copolymer (A) is dissolved or dispersed in water or an organic solvent with stirring, and a method in which a mixture of the modified propylene-α-olefin copolymer (A) and water or an organic solvent is heated with stirring to attain a completely or incompletely dissolved state, and then gradually cooled from this state to form fine particles. As a method for forming fine particles, for example, with a solvent composition set beforehand to precipitate at 60 to 100° C., and with an average cooling rate in this temperature range controlled to be 1 to 20° C./hour, preferably 2 to 10° C./hour, the mixture is cooled to cause the precipitation. Alternatively, the copolymer may be dissolved in a good solvent alone, and after completing precipitation in the good solvent, a poor solvent may be added thereto to further cause the precipitation. Alternatively, after removing the water or organic solvent once, the resultant may be dissolved and dispersed in an arbitrary solvent, so as to be used as the coating material. The coating material of the present invention may contain the modified propylene-α-olefin copolymer (A) in any one of water and various organic solvents in a dispersed state, or with a part or the whole of the resin in a dissolved state.

When contained in the coating material in a concentration of 10 wt % (for example, 10 parts by weight of the olefin resin with respect to 90 parts by weight of methyl cyclohexane), the modified propylene-α-olefin copolymer (A) has a viscosity, measured under 60 rpm at 23° C., of preferably 500 mPa·s or less. A lower limit is preferably 0.5 mPa·s, and more preferably 1 mPa·s. On the other hand, an upper limit is preferably 300 mPa·s, more preferably 30 mPa·s, and particularly preferably 10 mPa·s. When the viscosity measured under 60 rpm falls in this range, the coating material can be preferably applied to various coating methods. When the viscosity is equal to or lower than the upper limit, the stability and the handleability of the coating material are excellent. Further, streaks and unevenness are suppressed, and a coated film with a uniform thickness can be obtained. On the other hand, when it is equal to or higher than the lower limit, the thickness of the coated film can be easily ensured, and permeation of the coating material into a base material and degradation of the base material can be suppressed.

A content of the modified propylene-α-olefin copolymer (A) in the first coating material of the present invention is typically 0.1 to 100 parts by weight based on 100 parts by weight of the water or organic solvent, and an upper limit is preferably 55 parts by weight, more preferably 40 parts by weight, further preferably 25 parts by weight, and particularly preferably 15 parts by weight. Further, a lower limit is preferably 3 parts by weight, and more preferably 8 parts by weight.

When the content of the modified propylene-α-olefin copolymer (A), based on 100 parts by weight of the water or organic solvent, is equal to or lower than the upper limit, the coating material is excellent in the stability and the handleability. Further, streaks and unevenness are suppressed, and a coated film with a uniform thickness can be obtained. On the other hand, when the content is equal to or higher than the lower limit, the thickness of the coated film can be easily ensured, and an excellent drying property can be also attained. Further, the permeation of the coating material into the base material and the degradation of the base material can be suppressed.

A second coating material of the present invention contains a modified propylene-α-olefin copolymer (A), a second resin (B1), and water or an organic solvent. The modified propylene-α-olefin copolymer (A) and the organic solvent can be defined in the same manner as described above.

<Second Resin (B1)>

Examples of the second resin (B1) include olefin-based resin, styrene-based resin, polyurethane, polyester, polyamide, polycarbonate, polyvinyl alcohol, polyvinyl acetate, epoxy resin, acrylic resin, rosin resin, alkyd resin, urea resin, melamine resin, phenolic resin, coumarone resin, ketone resin, cellulose-based resin, chlorinated polyolefin, and mixed resins thereof. In particular, from the viewpoint of the compatibility with the modified propylene-α-olefin copolymer (A), an olefin-based resin or a styrene-based resin is preferred, and an olefin-based elastomer or a styrene-based elastomer is particularly preferred. When the second coating material is used as a primer, from the viewpoint of easily attaining adhesiveness to an overcoat layer, a polyurethane, an epoxy resin or an acrylic resin is preferred, and an acrylic resin is particularly preferred.

As the olefin-based elastomer, a propylene-based elastomer is preferred. Examples of the propylene-based elastomer include propylene-1-butene copolymer and acid-modified propylene-1-butene copolymer. As the styrene-based elastomer, a block copolymer containing 10 to 60 mol % of styrene unit is preferred, and examples thereof include Tuftec (manufactured by Asahi Kasei Corporation), Septon (manufactured by Kuraray Co., Ltd.) and Kraton (manufactured by Shell). These olefin-based elastomers and styrene-based elastomers are also excellent in the adhesiveness to an olefin-based base material to be coated.

The second resin (B1) may be graft copolymerized with a polar monomer, if necessary. Examples of the polar monomer include hydroxyl group-containing ethylenically unsaturated compounds, amino group-containing ethylenically unsaturated compounds, epoxy group-containing ethylenically unsaturated compounds, unsaturated carboxylic acids, anhydrides thereof and derivatives thereof. A vinyl ester compound, and an unsaturated carboxylic acid or an anhydride thereof is preferred for improving the solvent solubility and the adhesiveness to the base material to be coated.

When the second resin (B1) is combined with the modified propylene-α-olefin copolymer (A) of the present invention, the stability and the coatability of the coating material of the present invention, the blocking resistance of a coated film, and the adhesiveness to a base material to be coated can be improved. The detailed mechanism is not clear but is presumed as follows. When the coating material of the present invention is used, a low molecular weight component of the modified propylene-α-olefin copolymer (A) is compatible with the above-described resin, and hence the viscosity of the resin is effectively reduced, which probably to increase the stability and the coatability of the coating material. It is also presumed that since a property for following the base material to be coated is increased, the adhesiveness to the base material to be coated is improved. Further, the low molecular weight component constructs crystalline forms more easily when forming a coated film, and hence, the curing rate can be probably easily increased. Furthermore, as described later, it is presumed that, because of an interaction between polar groups present at molecular ends of the modified propylene-α-olefin copolymer (A), the molecular weight can be easily artificially increased so as to attain the blocking resistance.

A method for dissolving or dispersing the modified propylene-α-olefin copolymer (A) and the second resin (B1) in water or an organic solvent is not especially limited, and examples thereof include a method in which the modified propylene-α-olefin copolymer (A) and the second resin (B1) are dissolved or dispersed in water or an organic solvent with stirring, and a method in which a mixture of the modified propylene-α-olefin copolymer (A), the second resin (B1) and water or an organic solvent is heated with stirring to attain a completely or incompletely dissolved state, and then gradually cooled from this state to form fine particles.

The order of dissolving or dispersing the modified propylene-α-olefin copolymer (A) and the second resin (B1) in water or an organic solvent is not especially limited: and either one of these may be dissolved or dispersed in water or an organic solvent and then the other is dissolved or dispersed in the water or organic solvent; both may be simultaneously dissolved or dispersed in water or an organic solvent; or a resin composition containing the modified propylene-α-olefin copolymer (A) and the second resin (B1) may be dissolved or dispersed in water or an organic solvent.

As a method for forming fine particles, for example, with a solvent composition set beforehand to precipitate at 60 to 100° C., and with an average cooling rate in this temperature range controlled to be 1 to 20° C./hour, preferably 2 to 10° C./hour, the mixture is cooled to cause the precipitation. Alternatively, the copolymer may be dissolved in a good solvent alone, and after completing precipitation in the good solvent, a poor solvent may be added thereto to further cause the precipitation. Alternatively, after removing the water or organic solvent once, the resultant may be dissolved and dispersed in an arbitrary solvent, so as to be used as the coating material. The coating material of the present invention may contain the modified propylene-α-olefin copolymer (A) in any one of water and various organic solvents in a dispersed state, or with a part or the whole of the resin in a dissolved state.

The total amount of the modified propylene-α-olefin copolymer (A) and the second resin (B1) in the second coating material of the present invention is typically 0.1 to 100 parts by weight based on 100 parts by weight of the water or organic solvent, and the upper limit is preferably 70 parts by weight, more preferably 40 parts by weight, and particularly preferably 30 parts by weight. Further, the lower limit is preferably 3 parts by weight, and more preferably 8 parts by weight.

A weight ratio between the modified propylene-α-olefin copolymer (A) and the second resin (B1) in the second coating material of the present invention is typically 1/99 to 90/10, preferably 1/99 to 50/50, more preferably 2/98 to 30/70, and further preferably 8/92 to 25/75. When the ratio falls in the above-described range, the stability and the coatability of the coating material of the present invention, and the blocking resistance and the adhesiveness to a base material of a resultant coated film can be improved, and the characteristics such as the strength and the heat resistance of the second resin can be satisfactorily retained.

The coating material of the present invention (namely, the first or second coating material of the present invention) can be applied to a surface of a base material to be coated such as a resin molded product. The coating material may be mixed with another coating material such as an acrylic coating material to be applied.

A method for applying the coating material of the present invention is not especially limited, and it is preferably sprayed or applied with a brush, a coater or the like, and the application can be performed by spraying it onto a surface to be coated by using, for example, a spray gun. The application can be easily performed at a normal temperature in general. Further, a drying method performed after the application is not especially limited, and it can be dried by an appropriate method of natural drying, forced drying by heating, or the like.

After the coating material of the present invention is applied onto and dried on the surface of the base material to be coated in this manner, another paint can be applied to the surface of the base material to be coated by a method of electrostatic coating, spray coating, brush coating or the like. The application of the paint may be performed by applying an overcoat after applying an undercoat. The paint to be used is not especially limited, and the coating material of the present invention is preferably used because it can be undercoated beforehand on a base material to be coated for suitably forming a primer coated film having high paint adhesiveness in the case of a coating using a solvent-based thermoplastic acrylic resin paint, a solvent-type thermosetting acrylic resin paint, an acrylic-modified alkyd resin paint, a polyester paint, an epoxy resin paint, a polyurethane resin paint, a melamine resin paint or the like.

After applying the paint onto the base material to be coated, the coated film can be cured by a typically used method of heating with a Nichrome wire, infrared radiation, radiofrequency radiation or the like, so as to obtain a molded product having a desired coated film thereon. A method for curing the coated film can be appropriately selected in accordance with the properties and the shape of the base material to be coated, the properties of the paint to be used, and the like. The present coating material can be used for improving the adhesiveness to surfaces of various base materials to be coated as well as for forming a coated film having higher image clearness or the like.

Examples of the base material to be coated with the coating material of the present invention include molded products made of polyolefins such as high pressure polyethylene, low/medium pressure polyethylene, polypropylene, poly-4-methyl-pentene and polystyrene; and olefin-based copolymers such as an ethylene-propylene copolymer, an ethylene-butene copolymer and a propylene-butene copolymer. In particular, it can be suitably used for a molded product made of polypropylene, an ethylene-propylene copolymer, an ethylene-butene copolymer or a propylene-butene copolymer.

The coating material of the present invention can be used, not only for molded products made of the aforementioned polyolefins and olefin-based copolymers, but also for a molded product made of polypropylene and synthetic rubber, a molded product, such as a vehicle bumper, made of a polyamide resin, an unsaturated polyester resin, a polybutylene terephthalate resin, or a polycarbonate resin, and further for a surface treatment of a steel sheet, an electrodeposited steel sheet or the like. Further, it can be undercoated on a surface where a paint, a primer, an adhesive or the like containing, as a principal component, a polyurethane resin, a fatty acid-modified polyester resin, an oil-free polyester resin, a melamine resin, an epoxy resin or the like has been applied, so as to improve the adhesiveness to the surface of the paint or the like, and to form a coated film excellent in the image clearness, low-temperature impact resistance and the like.

In particular, the coating material of the present invention is suitably undercoated on a molded product made of a polyolefin such as polypropylene, a molded product of a vehicle bumper or the like made of polypropylene and synthetic rubber, an SMC molded product using an unsaturated polyester resin, an epoxy resin or the like, an R-RIM molded product of a polyurethane resin, a glass fiber reinforced polyamide resin molded product, a polyurethane resin molded product, a cation electrodeposited steel sheet or the like, so as to improve the adhesiveness of a paint to the surface of such a molded product.

A coat layer (such as a primer layer) formed by applying the coating material of the present invention contains the modified propylene-α-olefin copolymer (A) having a low melting point, and hence can be heat-sealed at a low temperature.

Further, a coat layer (such as a primer layer) formed by applying the coating material of the present invention can be cured (crystallized) in a short time. The reason is not clear, but probably because the modified propylene-α-olefin copolymer (A) has polar groups in molecular end portions and hence the crystallization temperature is merely slightly lowered.

Furthermore, a coat layer (such as a primer layer) formed by applying the coating material of the present invention can exhibit high blocking resistance. The reason is not clear but is presumed as follows. In general, when a propylene-α-olefin copolymer is modified, many of polar group structural units are grafted onto a main chain, and hence the crystallinity of the main chains is lowered, which probably results in that the crystallization temperature is excessively lowered or the hardness is degraded. On the contrary, since the modified propylene-α-olefin copolymer (A) is regarded to contain a large number of polar groups at molecular ends, although the melting point (Tm) is comparatively low, the crystallization temperature and the hardness are high, which probably results in the excellent blocking resistance. Further, two molecular ends interact with each other and form a long pseudo-polymer chain, which may probably lead to an effect that exudation of a low molecular weight substance can be inhibited.

Moreover, a coat layer (such as a primer layer) formed by applying the coating material of the present invention can exhibit high coated film adhesiveness. The reason is not clear but is presumed as follows. Since the coating material containing the modified propylene-α-olefin copolymer (A) has a low viscosity, it is regarded to be excellent in the adhesiveness to a base material to be coated. Further, as described above, the modified propylene-α-olefin copolymer (A) is regarded to contain a large number of polar groups in molecular end portions, and hence, it is regarded that the crystallinity of the main chains is high and that the coated film itself has high strength. As a result, an interface between the coated film and the base material to be coated is difficult to break, and this may be the reason for the excellent coated film adhesiveness being exhibited. Furthermore, the modified propylene-α-olefin copolymer (A) is regarded to be partly crosslinked during the synthesis. In the parts having attained a high molecular weight by the crosslinkage, molecular chains are easily entangled with one another by heat-seal or the like, which probably increases the strength of the coat layer.

3-2. Moldable Resin Composition

A moldable resin composition of the present invention contains at least one resin (B2) selected from the group consisting of thermoplastic resins and thermosetting resins, an inorganic reinforcing material (C), and a modified propylene-α-olefin copolymer (A).

<At Least One Resin (B2) Selected from Group Consisting of Thermoplastic Resins and Thermosetting Resins>

The thermoplastic resin can be at least one resin selected from the group consisting of polycarbonate resins, thermoplastic polyester resins, ABS resins, polyacetal resins, polyamide resins, polyphenylene oxide resins and polyimide resins. The thermosetting resin can be at least one resin selected from the group consisting of epoxy resins, thermosetting unsaturated polyester resins and phenolic resins. In other words, these thermoplastic resins and thermosetting resins can be used singly, or in combination.

The polycarbonate resin is typically an aromatic polycarbonate resin obtained by reacting an aromatic diol (such as bisphenol A) with phosgene, and can be preferably diethylene glycol diallyl carbonate. Such a polycarbonate resin is commercially available under a product name of, for example, NOVAREX (Mitsubishi-Engineering Plastics Corporation), Panlite (Teijin Chemicals Ltd.), or Lexan (SABIC Innovative Plastics).

The thermoplastic polyester resin is typically a resin obtained by polycondensation of a dicarboxylic acid and a diol, and can be preferably polyethylene terephthalate, polybutylene terephthalate, polyethylene 2,6-naphthalene dicarboxylate, polycyclohexane terephthalate or the like. Such a thermoplastic polyester resin is commercially available under a product name of, for example, Rynite (Du Pont).

The ABS resin is typically an impact resistant resin obtained by graft polymerization of polybutadiene with acrylonitrile and styrene, and can be preferably a resin containing 5 to 40 wt % of a polybutadiene component and having a ratio in grafted amount between a styrene component and an acrylonitrile component (styrene/acrylonitrile) of 70/30 to 80/20. Such an ABS resin is commercially available under a product name of, for example, Stylac (Asahi Kasei Chemicals Corporation) or Cycolac (Ube Cycon Ltd.).

A polyacetal resin is typically a resin obtained by ring-opening polymerization of formalin or trioxane, with ethylene oxide if desired, in the presence of a cationic catalyst, which has a polyoxymethylene chain as a main skeleton, and can be preferably a copolymer type resin. Such a polyacetal resin is commercially available under a product name of, for example, Iupital (Mitsubishi Engineering-Plastics Corporation).

A polyamide resin is typically a resin obtained by the polycondensation of a diamine and a dicarboxylic acid, the ring-opening polymerization of caprolactam, or the like, and can be preferably a polycondensation reaction product of an aliphatic diamine and an aliphatic or aromatic dicarboxylic acid. Such a polyamide resin is commercially available under a product name of, for example, Leona (Asahi Kasei Chemicals Corporation) or Zytel (Du Pont).

A polyphenylene oxide resin is typically a resin obtained by oxidative coupling of 2,6-dimethylphenol in the presence of a copper catalyst, and includes a modified polyphenylene oxide resin modified by a method of, for example, blending another resin with this resin. In the present invention, a blended modified product of a styrene-based polymer is preferred. Such a polyphenylene oxide resin is commercially available under a product name of, for example, Zylon (Asahi Kasei Chemicals Corporation) or Iupiace (Mitsubishi Engineering-Plastics Corporation).

A polyimide resin is typically a resin obtained by the polycondensation of a tetracarboxylic acid and a diamine for producing an imide bond in a main skeleton, and may be preferably a resin produced from pyromellitic anhydride and diamino diphenyl ether. Such a polyimide resin is commercially available under a product name of, for example, Vespel (Du Pont).

An epoxy resin is typically a resin obtained by reacting an aromatic diol (such as bisphenol A) with epichlorohydrin in the presence of an alkali, and can be preferably a bisphenol A-type epoxy resin, a bisphenol F-type epoxy resin or a bisphenol S-type epoxy resin each having an epoxy equivalent of 170 to 5,000. Such an epoxy resin is commercially available under a product name of, for example, EPOMIK (Mitsui Chemicals, Inc.), EPICLON (Dainippon Ink And Chemicals Inc.) or Sumi-Epoxy (Sumitomo Chemical Co., Ltd.).

A thermosetting unsaturated polyester resin is typically a resin obtained by esterification of an aliphatic unsaturated dicarboxylic acid and an aliphatic diol, and can be preferably a resin obtained by the esterification of an unsaturated dicarboxylic acid, such as maleic acid or fumaric acid, and a diol, such as ethylene glycol or diethylene glycol. Such a thermosetting unsaturated polyester resin is commercially available under a product name of, for example, Rigolac (Showa Highpolymer Co., Ltd.) or SUMIKON (Sumitomo Bakelite Co., Ltd.).

A phenolic resin includes both of so-called novolac type and resol type, and is preferably a novolac type resin to be cured with hexamethylenetetramine or a solid resol type resin mainly having dimethylene ether bonds. Such a phenolic resin is commercially available under a product name of, for example, SUMIKON PM (Sumitomo Bakelite Co., Ltd.) or Nikkaline (Nippon Synthetic Chemical Industry Co., Ltd.).

Among these, a polycarbonate resin, polybutylene terephthalate, that is, one of thermoplastic polyester resins, and a combination of a polycarbonate resin and an ABS resin are preferred.

A content of the at least one resin (B2) selected from the group consisting of thermoplastic resins and thermosetting resins is preferably 50 to 95 parts by weight, more preferably 70 to 95 parts by weight, and further preferably 80 to 95 parts by weight based on 100 parts by weight of the resin composition.

<Inorganic Reinforcing Material (C)>

The inorganic reinforcing material (C) can be at least one selected from glass fibers, carbon fibers and fillers. As the inorganic reinforcing material (C), these can be used singly or in combination.

The type of glass fiber is not especially limited, and examples include roving glass, chopped strand glass and milled glass.

The length of the glass fiber is not especially limited since fibers may be fractured when mixed with a resin by an extruder or the like, and from the viewpoint of the workability, the length is 0.3 mm to 10 mm, and preferably 2 mm to 7 mm. The length of the glass fiber in the resin composition is preferably 2 mm to 5 mm. An average fiber diameter of the glass fiber is also not especially limited, and is 1 to 25 µm and preferably 5 to 17 µm. An aspect ratio (average fiber length/fiber diameter) of the glass fiber in the resin composition is preferably 25 or less, and glass fibers having different aspect ratios can be mixed at an appropriate ratio for use. A cross-sectional shape of the glass fiber is also not especially limited, and can be a circular shape, a cocoon shape, a gourd shape, an elliptical shape or a cylindrical shape.

The glass fiber may be surface treated with a silane coupling agent, a titanate coupling agent, an aluminate coupling agent or the like. Examples of the silane coupling agent include vinyl trichlorosilane, vinyl triethoxy silane, vinyl trimethoxy silane, γ-methacryloxypropyltrimethoxysilane, β-(3,4-epoxycyclohexyl)ethyltrimethoxysilane, γ-glycidoxypropyltrimethoxysilane, N-β(aminoethyl) γ-aminopropyltrimethoxysilane, γ-aminopropyltriethoxysilane, N-phenyl-γ-aminopropyltrimethoxysilane, γ-mercaptopropyltrimethoxysilane, and γ-chloropropyltrimethoxysilane.

The glass fiber may be sized with an olefin-based resin, a styrene-based resin, an acrylic-based resin, a polyester-based resin, an epoxy-based resin, a urethane-based resin or the like. In this case, the olefin-based resin or the urethane-based resin used for sizing the glass fiber is used in an amount not affecting the physical properties of the whole composition.

The glass fiber may be coated, by plating, vapor deposition or the like, with a metal such as nickel, copper, cobalt, silver, aluminum, iron, or an alloy of any of these metals.

The shape and the type of carbon fiber are not especially limited. The carbon fiber is in a shape of a chopped strand, a roving strand, a milled fiber or the like, and the type can be either of a pitch type and a polyacrylonitrile type.

The carbon fiber can be one obtained by spinning or molding a raw material composition and carbonizing the resultant, or one obtained by a method like vapor deposition in which spinning is not basically performed. When a carbon fiber obtained by the vapor deposition is used, the fiber diameter is small and the L/D is large, and therefore, a molded product having high rigidity as well as superior appearance can be obtained.

The carbon fiber can be surface treated with a silane coupling agent, a titanate coupling agent, an aluminate coupling agent or the like as described above. The carbon fiber can be sized with a sizing agent such as an epoxy-based resin or a urethane-based resin as described above.

The fiber diameter of the carbon fiber is typically 6 to 18 μm, preferably 0.5 to 15 μm, and particularly preferably 1 to 10 μm. The cut length of a chopped strand is preferably 1 to 15 mm, more preferably 2 to 10 mm, and most preferably 3 to 8 mm. Further, the chopped strand is crushed during the molding. An aspect ratio (L/D), that is, a ratio between the length L along the fiber axis direction and the fiber diameter D, of the carbon fiber in the resin composition is preferably 15 to 100, and more preferably 20 to 50.

Examples of the fillers include amorphous fillers such as calcium carbonate, silica, kaolin, clay, titanium oxide, barium sulfate, zinc oxide, aluminum hydroxide, alumina and magnesium hydroxide; plate-shaped fillers such as talc, mica and glass flake; needle-shaped fillers such as wollastonite, potassium titanate, basic magnesium sulfate, sepiolite, xonotlite and aluminum borate; and fillers of metal powders, metal flakes, carbon black and carbon fine particles. In addition, glass beads and glass powders can be used. These fillers may be used singly or in combination, or a single one of or a combination of these fillers coated with carbon or treated with a silane coupling agent or the like may be used.

Among these, a glass fiber and a carbon fiber are preferred, and from the viewpoint of the affinity with the modified propylene-α-olefin copolymer (A) of the present invention, a glass fiber is particularly preferred.

A proportion of the at least one resin (B2) selected from the group consisting of thermoplastic resins and thermosetting resins to the inorganic reinforcing material (C) is, in terms of a weight ratio, 100/0 to 50/50, and for improving the rigidity of a resultant molded product, the inorganic reinforcing material (C) is preferably contained. The proportion of the at least one resin (B2) selected from the group consisting of thermoplastic resins to thermosetting resins and the inorganic reinforcing material (C) is preferably 95/5 to 55/45, more preferably 93/7 to 65/35, and particularly preferably 92/8 to 85/15. When the proportion of the at least one resin (B2) selected from the group consisting of thermoplastic resins to thermosetting resins and the inorganic reinforcing material (C) falls in the above-described range, mechanical properties of the resin composition are excellently balanced.

<Modified Propylene-α-Olefin Copolymer (A)>

The modified propylene-α-olefin copolymer (A) can be the modified propylene-α-olefin copolymer (A) of the present invention.

A content of the modified propylene-α-olefin copolymer (A) is 0.01 to 10 parts by weight, preferably 0.05 to 8 parts by weight, more preferably 0.1 to 7 parts by weight, and further preferably 0.2 to 5 parts by weight based on 100 parts by weight of a total amount of the at least one resin (B2) selected from the group consisting of thermoplastic resins and thermosetting resins and the inorganic reinforcing material (C). When the content of the modified propylene-α-olefin copolymer (A) is smaller than 0.01 part by weight, it is difficult to attain superior moldability and impact resistance, and if it is larger than 10 parts by weight, the mechanical properties of a molded product of the resin composition are easily degraded.

The moldable resin composition of the present invention may contain, as long as the advantageous effects of the present invention are not impaired, arbitrary additives, for example, a flame retardant such as a brominated bisphenol, a brominated epoxy resin, brominated polystyrene, brominated polycarbonate, triphenyl phosphate, phosphonic acid amide, or red phosphorus, a flame retardant promoter such as antimony trioxide or sodium antimonate, a heat stabilizer such as a phosphate or phosphite, an antioxidant such as a hindered phenol, a heat resistant agent, a weathering agent, a light stabilizer, a mold releasing agent, a flow modifier, a coloring agent, a lubricant, an antistatic agent, a crystal nucleating agent, a plasticizer and a foaming agent, a slipping preventing agent, an antiblocking agent, an antifogging agent, a nucleating agent, a pigment, a filler, a dye, a plasticizer and the like if necessary.

A method for producing the moldable resin composition of the present invention may be an arbitrary method, and for example, a method in which the above-described respective components are mixed simultaneously or in an arbitrary order by using a tumbler, a V-blender, a Nauta mixer, a banbury mixer, a kneading roll, a single- or twin-screw extruder or the like may be appropriately employed.

The resin composition thus obtained is molded by any of various known methods, such as injection molding, extrusion molding and compression molding, and from the viewpoint of design and moldability, it can be preferably molded by the injection molding.

A molded product of the moldable resin composition of the present invention is excellent in balance among impact strength (toughness), an elastic modulus (rigidity) and tensile strength. The reason is not clear but it is presumed as follows. Since the modified propylene-α-olefin copolymer (A) contains a large number of polar groups in molecular end portions, it is finely dispersed as a rubber component in the moldable resin composition so as to effectively improve the impact strength. On the other hand, since the modified propylene-α-olefin copolymer (A) contains a large number of polar groups in molecular end portions, the crystallinity of main chains is increased so as to retain high values of the elastic modulus and the tensile strength.

Further, since the polar groups in molecular end portions of the modified propylene-α-olefin copolymer (A) have high mobility, they may easily interact with the glass fiber (the inorganic reinforcing material (C)) and have a high effect of opening the glass fiber. Therefore, the glass fiber can be easily finely dispersed in the moldable resin composition, and the modified propylene-α-olefin copolymer (A) is effectively oriented on the surface of the glass fiber. Accordingly, when impact is applied to the moldable resin composition, interfacial peeling is effectively caused between the at least one resin (B2) selected from the group consisting of thermoplastic resins and thermosetting resins, and the modified propylene-α-olefin copolymer (A) oriented on the surface of the glass fiber, so as to exhibit excellent impact strength.

Furthermore, since the modified propylene-α-olefin copolymer (A) contains a large number of polar groups in molecular end portions, it probably has high compatibility with the at least one resin (B2) selected from the group consisting of thermoplastic resins and thermosetting resins. Therefore, an artificial adhesive function may be attained between the at least one resin (B2) selected from the group consisting of thermoplastic resins and thermosetting resins and the surface of the glass fiber, and hence, a molded product having high elastic modulus and tensile strength can be easily obtained.

3-3. Hot Melt Composition

The hot melt composition of the present invention contains a base polymer (B3), a tackifier (D), and a modified propylene-α-olefin copolymer (A).

<Base Polymer (B3)>

The base polymer (B3) may be any of polymers typically used in a hot melt adhesive, and examples include the following:

1) Polyethylene
2) Ethylene-vinyl acetate copolymer (EVA)
3) Modified EVA polymer such as saponified EVA or graft modified EVA
4) Ethylene-(meth)acrylate copolymer such as ethylene-(meth)acrylate (EEA)
5) Ionomer resin obtained by partially neutralizing an ethylene-(meth)acrylic acid copolymer (a specific example is a resin available from Du Pont-Mitsui Polychemicals Co., Ltd. under a product name of Himilan)
6) Ethylene-propylene copolymer and ethylene-propylene-(meth)acrylic acid terpolymer
7) Polyamide: A reaction product of a dibasic acid and a diamine, examples including a reaction product of a dimer acid, that is, a dimer of a fatty acid of soy bean oil, China wood oil, tall oil or the like, and an alkyl diamine such as ethylenediamine or diethylenetriamine; and nylons such as nylon 12 (specific examples include Diamide (Dicel Chemical Industries, Ltd.), Platiron (Toagosei Chemical Industry Co., Ltd.) and Amilan (Toray Industries Inc.))
8) Polyester (examples include Ester Resin 200 and 300 (Toyobo Co., Ltd.) and Vital200 and 300 (Goodyear))
9) Propylene-based polymer (examples include atactic polypropylene and a propylene-$C_{4+}$ α-olefin copolymer (with the proviso of an Mw higher than 40,000))
10) Copolymer of a vinyl aromatic compound and a conjugated diene compound, and a hydrogenated product thereof (specific examples include styrene-butadiene random copolymer, styrene-isoprene random copolymer, butadiene-polystyrene block copolymer, polystyrene-polyisoprene block copolymer, polystyrene-polyisoprene-polystyrene triblock copolymer, polystyrene-polybutadiene-polystyrene triblock copolymer, poly(α-methylstyrene)-polybutadiene-poly(α-methylstyrene) triblock copolymer, and hydrogenated products thereof).

As the base polymer (B3), an ethylene-vinyl acetate copolymer (EVA), an ethylene-propylene copolymer, an ethylene-propylene-(meth)acrylic acid terpolymer, and a propylene-based polymer are preferred, and from the viewpoint of the compatibility, an ethylene-vinyl acetate copolymer (EVA) is particularly preferred.

Such a base polymer (B3) is commercially available. Examples include Cariflex TR-1101, TR-1107 and TR-4113 (manufactured by Shell Chemicals), Kraton G-6500, G-6521, G-1650, G-1652 and G-1657 (manufactured by Shell Chemicals), Solprene, and hydrogenated Solprene (manufactured by Philips). As the base polymer (B3), these may be used singly, or in combination.

<Tackifier (D)>

The tackifier (D) can be blended for controlling the viscosity of the base polymer (B3) when melted, so as to improve the hot tack property and wettability. Examples of the tackifier (D) include aliphatic hydrogenated tackifier, rosin, modified rosin and esterified products of these, aliphatic petroleum resin, alicyclic petroleum resin, aromatic petroleum resin, copolymerized petroleum resin of aliphatic component and aromatic component, low molecular weight styrene-based resin, isoprene resin, alkyl phenol resin, terpene resin, and coumarone-indene resin. As the tackifier (D), these may be used singly or in combination.

The tackifier (D) can be appropriately selected in accordance with the base polymer (B3). For example, when an ethylene-vinyl acetate copolymer (EVA) is used as the base polymer (B3), an alicyclic petroleum resin and (modified) rosin or the like are preferably used.

A content of the tackifier (D) is preferably 10 to 300 parts by weight based on 100 parts by weight of the base polymer (B3), and is more preferably 50 to 200 parts by weight for purpose of, for example, easily exhibiting adhesive force while retaining appropriate melt viscosity.

<Modified Propylene-α-Olefin Copolymer (A)>

The modified propylene-α-olefin copolymer (A) can be the modified propylene-α-olefin copolymer (A) of the present invention. The modified propylene-α-olefin copolymer (A) is regarded to be able to lower the melt viscosity without impairing the adhesiveness of the composition.

A content of the modified propylene-α-olefin copolymer (A) is preferably 1 to 100 parts by weight based on 100 parts by weight of the base polymer (B3), and is more preferably 20 to 80 parts by weight for purpose of easily lowering the melt viscosity while retaining superior adhesiveness.

The hot melt composition of the present invention may further contain an unmodified polyolefin, such as Sasol Wax (H-1: manufactured by Sasol) contained in a typical hot melt adhesive. Thus, the melt viscosity of the composition can be lowered to further improve the workability.

The hot melt composition of the present invention can contain, as long as the object of the present invention is not impaired, various additives such as a softening agent, a weathering stabilizer, a heat resistance stabilizer, an antistatic agent, a slipping preventing agent, an antiblocking agent, an anti-fogging agent, a nucleating agent, a lubricant, a pigment, a filler, a dye, a plasticizer, an age resistor, a hydrochloric acid absorber, an antioxidant, and a copper inhibitor, if necessary.

The hot melt composition of the present invention can be obtained by supplying the above-described respective components to a mixer such as a Brabender mixer, melting and mixing the components by heating, and then molding the resultant into a desired shape of particles, flakes, bars or the like.

The hot melt composition of the present invention can be used for, for example, forming a hot melt adhesive layer by melting it by heating and applying the melted composition onto a material to be coated, such as a fabric, kraft paper, an aluminum foil or a polyester film, by a general method.

Since the hot melt composition of the present invention contains the modified propylene-α-olefin copolymer (A) having a low melting point, it is regarded that it can be melted even at a low temperature.

Further, a cured substance of the hot melt composition of the present invention can exhibit high strength. The reason is not clear but is presumed as follows. Polar groups in molecular end portions of the modified propylene-α-olefin copolymer (A) have high mobility and can be easily interacted with the base polymer (B3) such as EVA. Further, since the modified propylene-α-olefin copolymer (A) has a hybrid structure of polyolefin chains and polar groups, and has a similar structure to the EVA, the compatibility between the modified propylene-α-olefin copolymer (A) and the base polymer (B3) such as EVA is improved.

EXAMPLES

The present invention will now be more specifically described with reference to examples, and it is noted that, within the scope of the present invention, the present invention is not limited to these examples.

Physical property values and the like used in examples and comparative examples were obtained by the following measurement methods.

[Composition of Polymer]

The contents of a propylene-derived constituent unit and a $C_{4+}$ α-olefin-derived constituent unit in a polymer were obtained by analysis of the $^{13}C$-NMR spectrum.

[Molecular Weight and Molecular Weight Distribution]

The weight average molecular weight (Mw) of a polymer was measured by the GPC. The GPC measurement was performed under the following conditions. Further, the weight average molecular weight (Mw) and the number average molecular weight (Mn) were obtained on the basis of a conversion method mentioned below with a calibration curve created by using a commercially available monodisperse standard polystyrene.

[Measurement Conditions]

Apparatus: gel permeation chromatograph, Alliance GPC2000 (manufactured by Waters)

Organic solvent: o-dichlorobenzene

Columns: two TSKgel GMH6-HT columns and two TSKgel GMH6-HTL columns (both manufactured by Tosoh Corporation)

Flow rate: 1.0 ml/min

Sample: 0.15 mg/mL o-dichlorobenzene solution

Temperature: 140° C.

Molecular weight conversion: PP conversion/general-purpose calibration

Incidentally, for the calculation of the general-purpose calibration, coefficients of Mark-Houwink viscosity equation were used. As the Mark-Houwink coefficients for PS and PP, values described in literatures (J. Polym. Sci., Part A-2, 8, 1803 (1970), and Makromol. Chem., 177, 213 (1976) were used.

[Melting Point (Tm)]

The melting point (Tm) was measured by using DSC-20 (manufactured by Seico Electronics Industrial Co., Ltd.) by the DSC (differential scanning calorimetry). Specifically, a temperature of an endothermic peak in a curve, which was obtained by increasing a temperature of about 10 mg of a sample from −20° C. to 200° C. at 10° C./min, was obtained as the melting point. The operation of increasing the temperature of the sample (a copolymer) up to about 200° C., retaining the temperature for 5 minutes and then lowering the temperature to −20° C. at 10° C./min was once performed before the above-described measurement with the temperature increased, so as to unify the heat history of the samples (the copolymer).

[Half Width of Melting Point Peak]

A peak width (° C.) in a position corresponding to a half height from the base line of the whole endothermic peak obtained by the above-described DSC to an endothermic peak top was obtained as the half width.

[Heat of Fusion (ΔH)]

The heat of fusion (ΔH) (J/g) was calculated on the basis of an area partitioned by the endothermic peak obtained by the above-described DSC and the base line of the whole endothermic peak.

[Crystallization Temperature (Tc)]

The crystallization temperature (Tc) of a polymer was measured by using DSC-20 (manufactured by Seico Electronics Industry Co., Ltd.) by the DSC (differential scanning calorimetry). Specifically, an operation of increasing a temperature of about 10 mg of a sample up to about 200° C., retaining the temperature for 5 minutes and lowering the temperature to −20° C. at 10° C./min was performed, and a temperature of an exothermic peak in a curve thus created was obtained as the crystallization temperature.

[Number of Vinylidene Groups]

The number of vinylidene groups in molecular end portions of the propylene-α-olefin copolymer (A1) was measured by the $^1H$-NMR. For the $^1H$-NMR, a nuclear magnetic resonance spectrometer JNM-ECX400P manufactured by JEOL Ltd. was used for performing the measurement at 120° C. after completely dissolving 20 mg of a sample in about 0.5 ml of deuterated o-dichlorobenzene in an NMR sample tube (5 mmφ). The number of vinylidene groups was calculated by substituting, into the following equation, a peak integrated intensity (C) corresponding to two protons derived from a vinylidene group observed in the vicinity of 4.7 ppm when the total integrated intensities of signals derived from the propylene-α-olefin copolymer (A1) were normalized to 2,000:

Number $L$ of vinylidene groups(/1,000 carbon atoms)=$C/2$

[Degree of Crystallinity]

A pressed sheet with a thickness of 1 mm was produced by heating a sample of a polymer by hot press at 180° C. for 5 minutes and then cooling the resultant with water by cold press for 5 minutes. The thus obtained pressed sheet was measured for a wide angle X-ray diffraction profile by using an X-ray diffractometer (RINT2500 manufactured by Rigaku Corporation) equipped with a rotatable sample holder under conditions of Cu-Kα radiation and 50 kV-300 mA by a transmission method with 2θ angle set to a range of 5° to 35°. In the thus obtained X-ray diffraction profile, a crystal-derived portion and a non-crystal derived portion were separated, so as to obtain the degree of crystallinity on the basis of a diffraction intensity ratio therebetween.

[Acid Value]

A precisely weighed sample was dissolved in a mixed solvent of mixed xylene and n-butanol in a mass ratio of 1:1 to obtain a sample solution. Then, the sample solution was titrated with a precedently standardized N/10 potassium hydroxide solution in alcohol (obtained by adding 5 g of ion-exchanged water to 7 g of special grade potassium hydroxide, adding primary ethyl alcohol to the resultant to give a volume of 1 L (liter), and standardizing the titer F by using N/10 hydrochloric acid and 1% phenolphthalein solution), and the acid value was calculated based on the resultant neutralization amount in accordance with the following equation:

Acid value(mgKOH/g)=(N/10 KOH titer(ml)×F× 5.61)/(sample(g)×0.01).

[Penetration]

In accordance with JIS K2207, a sample of the modified propylene-α-olefin copolymer (A) melted, while avoiding partial superheating and bubble forming, was cured by allowing it to stand still at room temperature of 15 to 30° C. for 1 to 1.5 hours. Thereafter, the resultant was kept at 25° C. in a thermostat, and after the temperature was stabilized, a depth in a surface portion of the sample where a specified needle entered in 5 seconds was obtained as the penetration (dmm).

[Half Crystallization Time]

A differential scanning calorimeter (DSC7, manufactured by PerkinElmer) was used, and about 5 mg of a sample was set and completely melted by allowing it to stand still at 200° C. for 5 minutes. Thereafter, the sample was rapidly cooled to 50° C. at a temperature lowering rate of 320° C./min for causing isothermal crystallization. A time elapsing from the start of the cooling until heat of the crystallization reached a half of the total calorific value was defined as the half crystallization time (seconds).

1. Preparation of Propylene-$C_{4+}$ α-Olefin Copolymer (A2)]

[Propylene-1-Butene Copolymer (A2-1)]

A 2,000 ml polymerization apparatus having been sufficiently purged with nitrogen was charged with 900 ml of dry hexane, 65 g of 1-butene and triisobutylaluminum (1.0 mmol) at room temperature, and the inside of the polymerization apparatus was heated to 70° C. and pressurized with propylene to 0.7 MPa. Subsequently, a toluene solution in which 0.002 mmol of dimethylmethylene(3-tert-butyl-5-methylcyclopentadienyl)fluorenyl zirconium dichloride in contact with 0.6 mmol, in terms of aluminum, of methylaluminoxane (manufactured by Tosoh Finechem Corporation) was added to the polymerization vessel, and polymerization was performed for 30 minutes with an internal temperature of 62° C. under the propylene pressure of 0.7 MPa, and then the polymerization was stopped by adding 20 ml of methanol. After depressurization, a polymer was precipitated from the polymerization solution in 2 L of methanol, and the thus obtained polymer was dried under vacuum at 130° C. for 12 hours to obtain a propylene-1-butene copolymer (A2-1).

[Propylene-1-Butene Copolymer (A2-2)]

A 2,000 ml polymerization apparatus having been sufficiently purged with nitrogen was charged with 900 ml of dry hexane, 30 g of 1-butene and triisobutylaluminum (1.0 mmol) at room temperature, and the inside of the polymerization apparatus was heated to 70° C. and pressurized with propylene to 0.7 MPa. Subsequently, a toluene solution in which 0.002 mmol of dimethylmethylene(3-tert-butyl-5-methylcyclopentadienyl)fluorenyl zirconium dichloride was in contact with 0.6 mmol, in terms of aluminum, of methylaluminoxane (manufactured by Tosoh Finechem Corporation) was added to the polymerization vessel, and polymerization was performed for 30 minutes with an internal temperature of 62° C. under the propylene pressure of 0.7 MPa, and then the polymerization was stopped by adding 20 ml of methanol. After depressurization, a polymer was precipitated from the polymerization solution in 2 L of methanol, and the thus obtained polymer was dried under vacuum at 130° C. for 12 hours to obtain a propylene-1-butene copolymer (A2-2).

[Propylene-Ethylene Copolymer (X2-2)]

As a propylene-ethylene copolymer (X2-2), SM668 (Titan Chemical) was used.

The physical properties of the respective copolymers obtained as described above were measured by the aforementioned methods. The results are shown in Table 1.

TABLE 1

| Propylene-α-olefin Copolymer (A2) | | A2-1 | A2-2 | X2-2 |
|---|---|---|---|---|
| Propylene Content | mol % | 79 | 89 | 97 |
| 1-Butene Content | mol % | 21 | 11 | — |
| Ethylene Content | mol % | — | — | 3 |
| Mw | | — | 225,000 | 227,000 | 221,000 |
| Melting Point (Tm) | ° C. | 86 | 97 | 149 |
| Half Width of Melting Point Peak | ° C. | 6 | 9 | 8 |
| Heat of Fusion (ΔH) | J/g | 45 | 50 | 90 |

2. Preparation of Modified Propylene-α-Olefin Copolymer (A)

Preparation Example 1

1) Preparation of Propylene-1-Butene Copolymer (A1-1)

A 1.5 L stainless steel thermal decomposition apparatus equipped with a stirrer, a nitrogen inlet tube and a condenser was charged with 200 g of the propylene-1-butene copolymer (A2-1) prepared above as the raw material, and the system was sufficiently purged with nitrogen. Next, with the nitrogen allowed to flow, the temperature within the thermal decomposition apparatus was increased to 380° C. for melting the resin, followed by stirring. After the resin temperature in the system had reached a prescribed temperature, the resin was heated for 4.5 hours for performing thermal decomposition. Thereafter, the temperature was lowered to a normal temperature to obtain a propylene-1-butene copolymer (A1-1).

2) Preparation of Modified Propylene-1-Butene Copolymer (A-1)

200 g of the thus obtained propylene-1-butene copolymer (A1-1) was added to 1,000 ml of toluene and was completely dissolved at 160° C. in a pressure-resistant autoclave. To the resultant, 16.3 g of maleic anhydride at 70° C. and 27.7 g of di-tertiary-butyl peroxide (PERBUTYL D manufactured by Nippon Oil & Fats Co., Ltd.) at a normal temperature were simultaneously supplied over 1.5 hours, and after aging for 1 hour, the solvent was removed by lowering the degree of vacuum to 1 mmHg to obtain a modified propylene-1-butene copolymer (A-1) having physical properties as shown in Table 2.

Preparation Example 2

1) Preparation of Propylene-1-Butene Copolymer (A1-1)

The propylene-1-butene copolymer (A1-1) was obtained in the same manner as in Preparation Example 1.

2) Preparation of Modified Propylene-1-Butene Copolymer (A-2)

200 g of the obtained propylene-1-butene copolymer (A1-1) was added to 1,000 ml of toluene and completely dissolved at 160° C. in a pressure-resistant autoclave. To the resultant, 6.8 g of maleic anhydride at 70° C. and 11.6 g of di-tertiary-butyl peroxide (PERBUTYL D manufactured by Nippon Oil & Fats Co., Ltd.) at a normal temperature were simultaneously supplied over 1.5 hours, and after aging for 1 hour, the solvent was removed by lowering the degree of vacuum to 1 mmHg to obtain a modified propylene-1-butene copolymer (A-2) having physical properties as shown in Table 2.

Preparation Example 3

1) Preparation of Propylene-1-Butene Copolymer (A1-2)

A propylene-1-butene copolymer (A1-2) was obtained in substantially the same manner as in Preparation Example 1 except that the above-described propylene-1-butene copolymer (A2-2) was used as the raw material and that the inside temperature of the thermal decomposition apparatus was set to 395° C.

2) Preparation of Modified Propylene-1-Butene Copolymer (A-3)

Subsequently, the modification reaction was caused between the thus obtained propylene-1-butene copolymer (A1-2) and maleic anhydride in the same manner as in Preparation Example 1 to obtain a modified propylene-1-butene copolymer (A-3) shown in Table 2.

Preparation Example 4

1) Preparation of Propylene-Ethylene Copolymer (X1-1)

A dry reaction vessel was washed with nitrogen and filled with 100 Ndm$^3$ of hydrogen and 10 dm$^3$ of liquid propylene. Nest, 30 cm$^3$ of a solution of methylaluminoxane in toluene and 300 g of ethylene were added thereto, and the resultant mixture was stirred at 30° C. for 15 minutes. Dimethylsilyl-bis(indenyl) zirconium-dichloride was dissolved in 15 cm$^3$ of a solution of methylaluminoxane in toluene, and the resultant was allowed to stand still for 15 minutes for pre-activation. Subsequently, the resultant solution was introduced into the reaction vessel, and polymerization reaction was performed at a polymerization temperature of 60° C. for 60 minutes with a residual amount of ethylene homogeneously added. In this manner, a propylene-ethylene copolymer (X1-1) was obtained.

2) Preparation of Modified Propylene-Ethylene Copolymer (X-1)

The modification reaction was caused between the obtained propylene-ethylene copolymer (X1-1) and maleic anhydride in the same manner as in Preparation Example 1 to obtain a modified propylene-ethylene copolymer (X-1) shown in Table 2.

Preparation Example 5

1) Preparation of Propylene-Ethylene Copolymer (X1-2)

A propylene-ethylene copolymer (X1-2) was obtained in substantially the same manner as in Preparation Example 1 except that the propylene-ethylene copolymer (X2-2) prepared above was used as the raw material.

2) Preparation of Modified Propylene-Ethylene Copolymer (X-2)

The modification reaction was caused between the thus obtained propylene-ethylene copolymer (X1-2) and maleic anhydride in the same manner as in Preparation Example 1 to obtain a modified propylene-ethylene copolymer (X-2) shown in Table 2.

Preparation Example 6

1) Preparation of Propylene-Ethylene Copolymer (X1-3)

Mitsui HI-WAX (trademark) 110P (manufactured by Mitsui Chemicals, Inc.) was used as a raw material as a propylene-ethylene copolymer (X1-3).

2) Preparation of Modified Propylene-Ethylene Copolymer (X-3)

The modification reaction was caused between the obtained propylene-ethylene copolymer (X1-3) and maleic anhydride in the same manner as in Preparation Example 1 to obtain a modified propylene-ethylene copolymer (X-3) shown in Table 2.

The physical properties of the copolymers obtained in Preparation Examples 1 to 6 were measured by the above-described methods. The results are shown in Table 2.

TABLE 2

| | | | Preparation Example 1 | Preparation Example 2 | Preparation Example 3 | Preparation Example 4 | Preparation Example 5 | Preparation Example 6 |
|---|---|---|---|---|---|---|---|---|
| Before Modification | Propylene-α-olefin Copolymer (A1) | | A1-1 | A1-1 | A1-2 | X1-1 | X1-2 | X1-3 |
| | Preparation Method | — | Thermal Decomposition | Thermal Decomposition | Thermal Decomposition | Direct Polymerization with Metallocene | Thermal Decomposition | Direct Polymerization with Ziegler |
| | Propylene Content | mol % | 79 | 79 | 89 | 85 | 97 | 6 |
| | 1-Butene Content | mol % | 21 | 21 | 11 | — | — | — |
| | Ethylene Content | mol % | — | — | — | 15 | 3 | 94 |
| | Mw | — | 9,300 | 9,300 | 10,600 | 11,000 | 7,800 | 1,800 |

TABLE 2-continued

| | | | Preparation Example 1 | Preparation Example 2 | Preparation Example 3 | Preparation Example 4 | Preparation Example 5 | Preparation Example 6 |
|---|---|---|---|---|---|---|---|---|
| | Melting Point (Tm) | °C. | 78 | 78 | 93 | 73 | 138 | 96 |
| | Crystallization Temperature (Tc) | °C. | 41 | 41 | 61 | 37 | 102 | 75 |
| | Half Width of Melting Point Peak | °C. | 13 | 13 | 10 | 27 | 10 | 51 |
| | Heat of Fusion (ΔH) | J/g | 50 | 50 | 59 | 29 | 90 | 180 |
| | Number of Unsaturated Groups at Ends (Vinylidene) | /1,000 carbon atoms | 3.0 | 3.0 | 2.9 | <0.1 | 4.1 | <0.1 |
| | Degree of Crystallinity | % | 54 | 54 | 62 | 37 | 60 | 80 |
| After Modification | Modified Propylene-α-olefin Copolymer (A) | — | A-1 | A-2 | A-3 | X-1 | X-2 | X-3 |
| | Mw | | 20,500 | 14,800 | 19,900 | 11,500 | 26,500 | 2,900 |
| | Melting Point (Tm) | °C. | 69 | 77 | 88 | 71 | 132 | 87 |
| | Crystallization Temperature (Tc) | °C. | 38 | 39 | 45 | 22 | 97 | 71 |
| | Half Width of Melting Point Peak | °C. | 20 | 18 | 17 | 33 | 18 | 54 |
| | Heat of Fusion (ΔH) | J/g | 37 | 40 | 49 | 23 | 72 | 134 |
| | Acid Value | KOH mg/g | 45 | 23 | 47 | 48 | 45 | 59 |
| | Penetration | dmm | 1 | 1 | 1 | 11 | 1 | 6 |
| | Half Crystallization time | s | 515 | 193 | 100 | 526 | <10 | <10 |
| Tc(A1)/Tc(A) | | — | 1.1 | 1.1 | 1.4 | 1.7 | 1.1 | 1.1 |

It was found that the increase in molecular weight through the modification reaction is smaller in the propylene-1-butene copolymers (A1-1) and (A1-2), that is, the thermally decomposed products of Preparation Examples 1 to 3, than in the propylene-ethylene copolymer (X2-2), that is, the thermally decomposed product of Preparation Example 5. The reason is not clear but is presumed as follows. Since the propylene-1-butene copolymers (A-1) to (A-3) of Preparation Examples 1 to 3 contain not only propylene but also a $C_{4+}$ α-olefin unit such as butene, internal double bonds regarded to be less reactive can be formed instead of vinyl groups, and as a result, the above-described crosslinking reactions can be suppressed.

The modified propylene-1-butene copolymers (A-1) to (A-3) of Preparation Examples 1 to 3 had low penetration (namely, high hardness) in spite of their low melting points as compared with the modified propylene-ethylene copolymers (X-1) to (X-3) of Preparation Examples 4 to 6. This is probably because the modified propylene-1-butene copolymers (A-1) to (A-3) have easily crystallizable properties as is found from the fact that their crystallization temperatures Tc and heat of fusion (ΔH) are high although their melting points are low. Further, since the modified propylene-1-butene copolymers (A-1) to (A-3) have a small half width of the melting point peak, it can be presumed that they contain less amount of sticky component, and this is probably also the reason why high hardness is exhibited.

The mechanism of the easy crystallization of the modified propylene-1-butene copolymers (A-1) to (A-3) of Preparation Examples 1 to 3 is not clear but is presumed as follows. In general, many of polar group structural units are grafted onto a main chain through modification, and hence, the crystallinity of the main chains is degraded, and this probably leads to a tendency of lowering of the crystallization temperature. On the contrary, the modified propylene-1-butene copolymers (A-1) to (A-3) are obtained by modifying the thermally decomposed products of the propylene-1-butene copolymers. The thermally decomposed product of the propylene-1-butene copolymer is regarded to contain a larger number of vinylidene groups in molecular end portions than a directly polymerized product of a propylene-ethylene copolymer. Therefore, the modified propylene-1-butene copolymers (A-1) to (A-3) obtained by modifying the thermally decomposed products of the propylene-1-butene copolymers contain a larger number of polar groups in molecular end portions than the modified propylene-ethylene copolymer (X-1) of Preparation Example 4 obtained by modifying the directly polymerized product of the propylene-ethylene copolymer, and hence can be easily crystallized.

It is found that the modified propylene-1-butene copolymers (A-1) to (A-3) of Preparation Examples 1 to 3 have a smaller value of the crystallization temperature ratio Tc(A)/Tc(A1), namely, a smaller degree of lowering of the crystallization temperature through the modification, than the modified propylene-ethylene copolymer (X-1) of Preparation Example 4. The reason is not clear but is presumed as follows. As described above, the modified propylene-1-butene copolymers (A-1) to (A-3) of Preparation Examples 1 to 3 are obtained by modifying the thermally decomposed products of the propylene-1-butene copolymers. The thermally decomposed product of the propylene-1-butene copolymer is regarded to contain a larger number of vinylidene groups in molecular end portions than the directly polymerized product of the propylene-ethylene copolymer. Therefore, the modified propylene-1-butene copolymers (A-1) to (A-3) obtained by modifying the thermally decomposed products of the propylene-1-butene copolymers contain a larger number of polar groups in molecular end portions than the modified propylene-ethylene copolymer (X-1) of Preparation Example 4 obtained by modifying the directly polymerized product of the propylene-ethylene copolymer, and hence, the crystallization is not inhibited.

It is revealed that the modified propylene-1-butene copolymers (A-1) to (A-3) of Preparation Examples 1 to 3 have a shorter half crystallization time than the modified propylene-ethylene copolymer (X-1) of Preparation Example 4. This is probably because, as described above, the modified propylene-1-butene copolymers (A-1) to (A-3) obtained by modifying the thermally decomposed products of the propylene-1-butene copolymers contain a larger number of polar groups in molecular end portions than the modified propylene-ethylene copolymer (X-1) of Preparation Example 4 obtained by modifying the directly polymerized product of the propylene-ethylene copolymer, and hence, the crystallization rate is high.

3. Coating Material 3-1. Aqueous Dispersion Composition

Example 1

Preparation of Acid-Modified Propylene-1-Butene Copolymer 100 parts by weight of the propylene-1-butene copolymer (A2-1) mixed with 1 part by weight of maleic anhydride and 0.3 part by weight of Perhexine 25B (manufactured by Nippon Oil & Fats Co., Ltd.) used as a polymerization initiator was modified by using a twin-screw extruder (PCM-30 manufactured by Ikegai Iron Works Ltd., L/D=40) at a heating temperature of 220° C. at a rate of 16 kg/hr to obtain an acid-modified propylene-1-butene copolymer.

Preparation of Aqueous Dispersion Composition

A mixture of 70 parts by weight of the propylene-1-butene copolymer (A2-1), 30 parts by weight of the acid-modified propylene-1-butene copolymer obtained as described above, 10 parts by weight of the modified propylene-1-butene copolymer (A-1) obtained in Preparation Example 1, and 4 parts by weight of potassium oleate was supplied to a hopper of a twin-screw extruder (PCM-30 manufactured by Ikegai Iron Works Ltd., L/D=40) at a rate of 3,000 g/hr, a 30% aqueous solution of 2-amino-2-methyl-1-propanol was continuously supplied through a supply port provided in a vent portion of the extruder, and the resultant was continuously extruded at a heating temperature of 230° C. The thus extruded resin mixture was extruded from a tip of a 40 mmφ single-screw extruder (L/D=27, barrel temperature: 130° C.) connected to a tip of the twin-screw extruder, and thus, an aqueous dispersion composition was obtained.

The thus obtained aqueous dispersion composition had a solid content concentration of 40% and an average particle size of 0.3 μm. Incidentally, a 50% cumulative average particle size obtained by using a dynamic light scattering nanotrac particle size analyzer "Microtrac UPA-EX150 (manufactured by Nikkiso Co., Ltd.)" was defined as the average particle size.

Preparation of Acrylic Resin Aqueous Dispersion

A reaction vessel equipped with a stirrer, a thermometer, a reflux condenser and a nitrogen inlet tube was charged with 300 g of ion-exchanged water and 1 g of sodium lauryl sulfate, and the resultant was heated up to 75° C. with stirring and purging with nitrogen. With the internal temperature retained at 75° C., 2 g of potassium persulfate used as a polymerization initiator was added and dissolved therein, and thereafter, an emulsion, which had been precedently prepared by adding 200 g of styrene, 220 g of 2-ethylhexyl acrylate and 9 g of methacrylic acid to 250 g of ion-exchanged water, 1 g of sodium lauryl sulfate and 9 g of acrylamide with stirring, was added to the reaction vessel in a dropwise manner continuously over 6 hours for performing polymerization. After completing the dropwise addition, the resultant was aged for 5 hours and neutralized to obtain an acrylic resin aqueous dispersion. The thus obtained acrylic resin aqueous dispersion had a solid content concentration of 40% and an average particle size of 0.2 μm.

The thus obtained aqueous dispersion composition of the propylene-1-butene copolymer (A2-1) and the above-described acrylic resin aqueous dispersion were mixed to attain a mass ratio of the aqueous dispersion composition/acrylic resin aqueous dispersion of 30/70. The resultant composition was applied on a rectangular sheet of polypropylene (product name: GP-6BS, manufactured by Prime Polymer Co., Ltd.), whose surface had been cleaned with isopropyl alcohol, to a dry thickness of 10 μm, and the resultant was treated in an oven at 60° C. for 3 minutes.

Then, the surface of the thus obtained primer layer was visually observed, and the appearance of the primer layer was evaluated based on the following criteria.

Evaluation of Appearance of Primer Layer

B: The surface may be slightly whitened but is glossy
D: The surface is whitened and cracked, and is not glossy Next, a white overcoat paint was applied to this coated film to a dry thickness of 80 μm, and the resultant coated film was allowed to stand still at room temperature for 10 minutes and then treated in an oven at 80° C. or 120° C. for 30 minutes to prepare a test piece.

A cut with a width of 1 cm was made in the coated film of the obtained test piece to peel an edge portion of the coated film, and then the edge portion was pulled at a rate of 50 mm/min in a direction of 180° to measure peel strength. The peel strength was evaluated based on the following criteria.

Evaluation of Peel Strength

1) When Treated at 80° C.
B: 600 g/cm or more
C: 400 g/cm or more and less than 600 g/cm
D: less than 400 g/cm
2) When Treated at 120° C.
B: 1,000 g/cm or more
C: 800 g/cm or more and less than 1,000 g/cm
D: less than 800 g/cm Example 2 and Comparative Examples 1 to 4

Aqueous dispersion compositions were obtained in substantially the same manner as in Example 1 except that the composition of the aqueous dispersion composition and the average particle size of a resin particle were changed as shown in Table 3, and were evaluated in the same manner.

The evaluation results of Examples 1 and 2 and Comparative Examples 1 to 4 are shown in Table 3.

TABLE 3

| | | | | Example 1 | Example 2 | Comparative Example 1 | Comparative Example 2 | Comparative Example 3 | Comparative Example 4 |
|---|---|---|---|---|---|---|---|---|---|
| Composition | (B1) | Unmodified Propylene-1-butene Copolymer (Polymer, XM5070) | parts by mass | 70 | 0 | 70 | 70 | 0 | 0 |
| | | Acid-modified Propylene-1-butene Copolymer (Polymer) | parts by mass | 30 | 100 | 30 | 30 | 100 | 100 |

TABLE 3-continued

|  |  |  | | Example 1 | Example 2 | Comparative Example 1 | Comparative Example 2 | Comparative Example 3 | Comparative Example 4 |
|---|---|---|---|---|---|---|---|---|---|
| Wax | (A) | Modified Propylene-1-butene Copolymer (A-1) of Preparation Example 1 | parts by mass | 10 | 30 | | | | |
|  | Alternatives | Modified Propylene-ethylene Copolymer (X-1) of Preparation Example 4 | parts by mass | | | 10 | | 30 | |
|  |  | Modified Propylene-ethylene Copolymer (X-2) of Preparation Example 5 | parts by mass | | | | 10 | | 30 |
| Particle Size of Resin Particles | | | μm | 0.3 | 0.2 | 0.3 | 0.3 | 0.3 | 0.2 |
| Appearance of Primer Layer | | | — | B | B | D | D | B | B |
| Peel Strength | Baking at 80° C. | | g/cm | B | B | B | D | B | C |
| (after top coating) | Baking at 120° C. | | g/cm | B | B | C | D | C | C |

As shown in Table 3, it is found that the primer layers obtained by using the aqueous dispersion compositions of Examples 1 and 2 containing the modified propylene-α-olefin copolymer (A) of the present invention have high peel strength than the primer layers obtained by using the aqueous dispersion compositions of Comparative Examples 1 to 4. The reason is not clear but is probably because the modified propylene-α-olefin copolymer (A) of the present invention is sufficiently heat-sealed at a baking temperature and sufficiently cured. Further, the modified propylene-α-olefin copolymer (A) of the present invention is regarded to contain a large number of polar groups in molecular end portions to increase the crystallinity of main chains, and hence the coated film itself attains high strength. Moreover, the modified propylene-α-olefin copolymer (A) of the present invention is partly crosslinked during the synthesis to have high molecular weight parts, and molecules are further entangled in this part through the heat-seal, which probably increases the peel strength.

3-2. Solvent-Dispersion Composition (Raw Materials)
<Preparation of Polar Monomer-Grafted Crosslinked Resin>
Synthesis of Propylene-Based Elastomer A 2 liter autoclave having been sufficiently purged with nitrogen was charged with 900 ml of hexane and 85 g of 1-butene, 1 mmol of triisobutylaluminum was added thereto, and the resultant was heated to 70° C. Thereafter, propylene was supplied to attain a total pressure of 7 kg/cm²G, 0.30 mmol of methylaminoxane and 0.001 mmol, in terms of Zr atom, of rac-dimethylsilylene-bis{1-(2-methyl-4-phenylindenyl)} zirconium dichloride produced by a method similar to that described in the above-described preparation example were added to the resultant, and with the total pressure retained at 7 kg/cm²G by continuously supplying propylene, polymerization was performed for 30 minutes. After the polymerization, the resultant was degassed to collect a polymer in a large amount of methanol, the collected polymer was vacuum dried at 110° C. for 12 hours to obtain a propylene-based elastomer having Mw of 240,000 and Tm of 91° C.

Preparation of Polar Monomer-Grafted Crosslinked Resin

Subsequently, 1.0 part by mass of a polar monomer (maleic anhydride) and 0.2 part by mass of a radical polymerization initiator (Perhexine 25B) were added to 50 parts by mass of the above-described propylene-based elastomer (synthesized product) and 50 parts by mass of a styrene-based elastomer (Tuftec H1051, SEBS manufactured by Asahi Kasei Corporation, styrene content: 40 parts by mass, Mw: 72,000) to be sufficiently mixed, and the resultant was subjected to extrusion modification by using a twin-screw extruder (manufactured by Nippon Placon Co., Ltd., 30 mm extruder, L/D=42, rotating in the same direction, two vent portions provided, pressure reduced to 0.08 MPa at the vent portions) at an extrusion temperature of 220° C., a rotational speed of 500 rev/min, and an extrusion rate of 16 kg/hr to obtain a polar monomer-grafted crosslinked resin.

Acid-modified Wax: modified propylene-1-butene copolymer (A-1) obtained in Preparation Example 1

Example 3

54 g of the polar monomer-grafted crosslinked resin prepared above and 6 g of the modified propylene-1-butene copolymer (A-1) obtained in Preparation Example 1 were simultaneously dissolved in 240 g of methylcyclohexane to obtain a solvent-dispersion composition having a solid content of 20 mass %.

Example 4

48 g of the polar monomer-grafted crosslinked resin prepared above and 12 g of the modified propylene-1-butene copolymer (A-1) obtained in Preparation Example 1 were simultaneously dissolved in 240 g of methylcyclohexane to obtain a solvent-dispersion composition having a solid content of 20%.

Comparative Example 5

Without using the modified propylene-1-butene copolymer (A-1) obtained in Preparation Example 1, 60 g of the polar monomer-grafted crosslinked resin prepared above was dissolved in 240 g of methylcyclohexane to obtain a solvent-dispersion composition having a solid content of 20%.

The stability on standing, the coatability and the adhesive strength of the obtained solvent-dispersion compositions were evaluated as follows.

[Stability on Standing]

After the obtained solvent-dispersion compositions were allowed to stand still for 1 week, the stability on standing was evaluated based on the following criteria.

B: No separation
C: Separation to some extent
D: Separation to a large extent

[Coatability]

The obtained solvent-dispersion compositions were applied on aluminum foils by using a bar coater to a dry thickness of 2 μm and then dried in the air. The thus obtained coated products were heated in an air oven set to 170° C. for 20 seconds. The appearances of the coated films of the coated products were evaluated based on the following criteria.

B: The coated film is free from streaks and unevenness and is uniform

D: The coated film has streaks and unevenness

[Adhesive Strength]

The obtained solvent-dispersion compositions were applied on aluminum foils by using a bar coater to a dry thickness of 2 μm and then dried in the air to form heat-seal layers. Subsequently, a PP sheet was placed on each of the heat seal layers and thermally sealed (heat-sealed) at 100° C. or 140° C. for 1 second. The adhesive strength on an interface between the heat-seal layer and the aluminum foil in the thus obtained laminated product was measured by a 180° peel test (at a rate of 100 mm/min).

The results of these evaluations are shown in Table 4.

TABLE 4

| | | | | Example 3 | Example 4 | Comparative Example 5 |
|---|---|---|---|---|---|---|
| Composition | (B1) | Polar Monomer-grafted Crosslinked Resin (Solvent Dispersion Type) | parts by mass | 90 | 80 | 100 |
| | (A) | Modified Propylene-1-butene Copolymer (A-1) | parts by mass | 10 | 20 | — |
| Evaluations | Stability on Standing | | | C | B | D |
| | Coatability | | | B | B | D |
| | Adhesive Strength | Heat-seal Temperature of 100° C. | N/15 mm | 6.6 | 7.2 | 5.4 |
| | | Heat-seal Temperature of 140° C. | N/15 mm | 12 | 12.2 | 10.8 |

As shown in Table 4, it is found that the solvent-dispersion compositions of Examples 3 and 4 containing the modified propylene-α-olefin copolymer (A) of the present invention have higher stability on standing and higher coatability as well as higher adhesive strength than the solvent-dispersion composition of Comparative Example 5. The reason is not clear but is presumed as follows. The coated surfaces after heating of the solvent-dispersion compositions of Examples 3 and 4 are uniform probably because the composition is sufficiently heat-sealed at the heating temperature by virtue of a low melting point of the modified propylene-α-olefin copolymer (A) of the present invention. Further, the adhesive strength of the solvent-dispersion compositions of Examples 3 and 4 is high probably because: the modified propylene-α-olefin copolymer (A) of the present invention contains a large number of polar groups in molecular end portions, and hence has a high crystallization rate and is sufficiently cured; and entanglement among molecules in parts where the molecular weight has been increased in the synthesis is further increased through the heat-seal. Moreover, since the modified propylene-α-olefin copolymer (A) of the present invention is regarded to contain a large number of polar groups in molecular end portions, the crystallinity of main chains is increased and hence the coated film itself attains high strength.

3-3. Solvent-Dissolution Composition

Example 5

A 200 ml Erlenmeyer flask was charged with 90 parts by mass of methylcyclohexane (having an SP value of 7.8) as an organic solvent and 10 parts by mass of the modified propylene-1-butene copolymer (A-1) obtained in Preparation Example 1 as a wax, and the resultant was stirred at room temperature by using a stirrer equipped with a heater to obtain a solvent-dissolution composition.

Examples 6 to 10 and Comparative Examples 6 to 11

Solvent-dissolution compositions were obtained in substantially the same manner as in Example 5 except that the types of the organic solvent and the wax were changed as shown in Table 5 or 6.

Comparative Example 12

A solvent-dissolution composition was prepared in substantially the same manner as in Example 5 except that the types of the organic solvent and the wax were changed as shown in Table 6. The composition was, however, gelled at a normal temperature, and hence could not be evaluated for the viscosity, the coatability, the blocking resistance and the coated film adhesiveness.

The solubility, the viscosity, the stability on standing, the coatability, the blocking resistance and the coated film adhesiveness of the solvent-dissolution compositions obtained in Examples 5 to 10 and Comparative Examples 6 to 11 were evaluated by the following methods.

[Solubility]

During the preparation of each solvent-dissolution composition, the stirrer was appropriately stopped to evaluate the stability at a normal temperature based on the following criteria.

A: The components are rapidly dissolved and the composition becomes transparent

B: The components are dissolved and the composition becomes transparent after 60 minutes C: The components are partially not dissolved but dispersed D: The components are not dissolved and the composition is swollen or gelled Subsequently, the dissolution composition was heated by a heater up to 40° C., followed by stirring for 1 hours, and then the stirrer was stopped again to evaluate the solubility at 40° C. based on the same criteria employed in the evaluation at a normal temperature. The solubility at 50° C. was evaluated in the same manner.

[Viscosity]

The viscosity measured under 60 rpm at a normal temperature of each of the obtained solvent-dissolution compositions was measured by using a B-type viscometer. A value read after 30 seconds was defined as the viscosity (mPa·s).

[Stability on Standing]

The state of each of the obtained solvent-dissolution compositions after allowing to stand still for 1 day at a normal temperature was evaluated based on the following criteria.

B: The composition is in a dissolved state, or it takes time for phases to separate D: The phases are rapidly separated, or difficult to disperse again

[Coatability]

Each of the compositions was applied on a PET (polyethylene terephthalate) film by using a thickness variable applicator to attain a thickness of a coated film of 5 μm, and then, the coated film was dried at a normal temperature or at 160° C. for 30 seconds, and the state of the film surface thus observed was evaluated based on the following criteria.

A: Transparent and uniform
B: Turbid but uniform
C: Partially uneven
D: Obvious streaks and unevenness

[Blocking Resistance]

In the above-described evaluation for the coatability, the blocking occurring on the film surface observed after drying at 160° C. for 30 seconds was evaluated based on the following criteria.

B: No blocking occurs
C: The blocking occurs to some extent
D: The blocking occurs

[Coated Film Adhesiveness]

In the above-described evaluation for the coatability, the adhesiveness between the coated film and the PET used as a base material attained after drying at 160° C. for 30 seconds was evaluated based on the following criteria.

B: The coated film adheres to the base material without peeling off even when rubbed
C: A part of the coated film peels off when rubbed
D: The coated film easily peels off Furthermore, in the above-described evaluation for the coatability, a PC (polycarbonate) film or a PA6 (polyamide 6) film was used as the base material instead of PET, and the adhesiveness between the coated film and the base material attained after drying at 160° C. for 30 seconds was evaluated.

Moreover, in the evaluation for the coatability, a PP (polypropylene) film was used as the base material, and the adhesiveness between the coated film and the base material attained after drying at 100° C. for 60 seconds was evaluated.

In addition, in the evaluation for the coatability, AL (aluminum) or SUS (stainless steel) was used as the base material, and the adhesiveness between the coated film and the base material attained after drying at 120° C. for 60 seconds was evaluated. The evaluation criteria were the same as those described above in all these evaluations.

The results of the evaluations of Examples 5 to 10 are shown in Table 5, and the results of the evaluations of Comparative Examples 6 to 12 are shown in Table 6.

TABLE 5

| | | | | Example 5 | Example 6 | Example 7 | Example 8 | Example 9 | Example 10 |
|---|---|---|---|---|---|---|---|---|---|
| Composition | Organic Solvent | Methyl Cyclohexane (SP value of 7.8) | parts by mass | 90 | 70 | 90 | 90 | | |
| | | Toluene (SP value of 8.8) | | | | | | 90 | |
| | | Ethyl Acetate (SP value of 9.1) | | | | | | | |
| | | Isopropyl Alcohol (SP value of 11.9) | | | | | | | 90 |
| | Wax (A) | Modified Propylene-1-butene Copolymer (A-1) of Preparation Example 1 | parts by mass | 10 | 30 | | | 10 | 10 |
| | | Modified Propylene-1-butene Copolymer (A-2) of Preparation Example 2 | | | | 10 | | | |
| | | Modified Propylene-1-butene Copolymer (A-3) of Preparation Example 3 | | | | | 10 | | |
| | Alternatives | Modified Propylene-ethylene Copolymer (X-1) of Preparation Example 4 | | | | | | | |
| | | Modified Propylene-ethylene Copolymer (X-2) of Preparation Example 5 | | | | | | | |
| | | Modified Propylene-ethylene Copolymer (X-3) of Preparation Example 6 | | | | | | | |
| Evaluations | Solubility | normal temperature | | — | A | B | A | C | B | C |
| | | 40° C. | | A | A | A | A | A | C |
| | | 50° C. | | A | A | A | A | A | C |
| | Viscosity | normal temperature | mPa·s | 115 | 6,500 | 6 | 48 | 19 | 3 |
| | Stability on Standing | normal temperature | | — | B | B | B | B | B | B |
| | Coatability | normal temperature | | — | A | B | A | A | A | C |
| | | 160° C. for 30 sec | | A | A | A | A | A | B |
| | Blocking Resistance | 160° C. for 30 sec | | — | B | B | B | B | B | B |

TABLE 5-continued

|  |  | Example 5 | Example 6 | Example 7 | Example 8 | Example 9 | Example 10 |
|---|---|---|---|---|---|---|---|
| Coated Film Adhesiveness | PET 160° C. for 30 sec | — | B | B | B | B | B | B |
|  | PC 160° C. for 30 sec | — | B | B | B | B | B | B |
|  | PA6 160° C. for 30 sec | — | B | B | B | B | B | B |
|  | PP 100° C. for 60 sec | — | B | B | B | B | B | B |
|  | AL 120° C. for 60 sec | — | C | C | C | C | C | C |
|  | SUS 120° C. for 60 sec | — | C | C | C | C | C | C |

TABLE 6

|  |  |  |  | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|
| Composition | Organic Solvent | Methyl Cyclohexane (SP value of 7.8) | parts by mass | 90 | 90 | 90 |  |  | 70 | 40 |
|  |  | Toluene (SP value of 8.8) |  |  |  |  | 90 |  |  |  |
|  |  | Ethyl Acetate (SP value of 9.1) |  |  |  |  |  |  |  |  |
|  |  | Isopropyl Alcohol (SP value of 11.9) |  |  |  |  |  | 90 |  |  |
|  | Wax (A) | Modified Propylene-1-butene Copolymer (A-1) of Preparation Example 1 | parts by mass |  |  |  |  |  |  |  |
|  |  | Modified Propylene-1-butene Copolymer (A-2) of Preparation Example 2 |  |  |  |  |  |  |  |  |
|  |  | Modified Propylene-1-butene Copolymer (A-3) of Preparation Example 3 |  |  |  |  |  |  |  |  |
|  | Alternatives | Modified Propylene-ethylene Copolymer (X-1) of Preparation Example 4 |  | 10 |  |  |  |  | 30 | 60 |
|  |  | Modified Propylene-ethylene Copolymer (X-2) of Preparation Example 5 |  |  | 10 |  | 10 | 10 |  |  |
|  |  | Modified Propylene-ethylene Copolymer (X-3) of Preparation Example 6 |  |  |  | 10 |  |  |  |  |
| Evaluations | Solubility | normal temperature | — | B | C | C | C | C | D | D |
|  |  | 40° C. |  | A | C | C | C | C | B | D |
|  |  | 50° C. |  | A | C | C | C | C | A | D |
|  | Viscosity | normal temperature | mPa·s | 48 | 36 | 4 | 9 | 3 | 1,180 | >10,000 |
|  | Stability on Standing | normal temperature | — | B | D | D | D | D | B | — |
|  | Coatability | normal temperature |  | A | D | D | D | D | B | — |
|  |  | 160° C. for 30 sec |  | A | D | C | D | D | A | — |
|  | Blocking Resistance | 160° C. for 30 sec | — | C | B | B | B | B | C | — |
|  | Coated Film Adhesiveness | PET 160° C. for 30 sec | — | B | D | C | D | D | B | — |
|  |  | PC 160° C. for 30 sec | — | B | D | C | D | D | B | — |
|  |  | PA6 160° C. for 30 sec | — | B | D | C | D | D | B | — |
|  |  | PP 100° C. for 60 sec | — | B | D | D | D | D | B | — |
|  |  | AL 120° C. for 60 sec | — | C | D | C | D | D | C | — |
|  |  | SUS 120° C. for 60 sec | — | C | D | C | D | D | C | — |

The compositions of Examples 5 to 10 have high solubility and stability on standing and exhibit excellent coatability, blocking resistance and coated film adhesiveness as compared with the compositions of Comparative Examples 6 to 12. The reason is not clear but is presumed as follows. Since the modified propylene-α-olefin copolymer (A) contained in the compositions of Examples 5 to 10 has a low melting point, and hence the compositions can be sufficiently heat-sealed at the drying temperature so as to improve the coatability.

Further, since the modified propylene-α-olefin copolymer (A) is regarded to contain a large number of polar groups in molecular end portions, it has a high crystallization temperature and high hardness although its melting point (Tm) is comparatively low, which probably leads to excellent blocking resistance. Furthermore, two molecular ends are interacted with each other to artificially form a long polymer chain so as to be able to inhibit exudation of a low molecular weight substance, which probably improves the blocking resistance.

Further, the reason of the high coated film adhesiveness is probably because the coating material containing the modified propylene-α-olefin copolymer (A) has a low viscosity.

Moreover, since the modified propylene-α-olefin copolymer (A) is regarded to contain a large number of polar groups in molecular end portions as described above, it is inferred that the crystallinity of main chains is high and that the coated film itself has high hardness. Furthermore, the modified propylene-α-olefin copolymer (A) is regarded to be partly crosslinked during the synthesis to have high molecular weight parts where molecular chains are easily entangled with one another by the heat-seal or the like. As a result, an interface between the coated film and the base material to be coated is difficult to break, and this probably leads to the excellent coated film adhesiveness.

4. Moldable Resin Composition (Raw Materials)
Thermoplastic Resin (B2):
Aromatic polycarbonate resin (Panlite L-1225Y, Teijin Chemicals Ltd.)
Inorganic Reinforcing Material (C):
Glass fiber for use in polycarbonate (Chopped strand CS(F)3PE455S, Nitto Boseki Co., Ltd.)
Wax:
Modified propylene-1-butene copolymer (A-1) of Preparation Example 1
Modified propylene-ethylene copolymer (X-3) of Preparation Example 6

Example 11

90 parts by weight of the aromatic polycarbonate resin (Panlite L-1225Y, Teijin Chemicals Ltd.), 10 parts by weight of the glass fiber for use in polycarbonate (Chopped strand CS(F)3PE455S, Nitto Boseki Co., Ltd.) and 3 parts by weight of the modified propylene-1-butene copolymer (A-1) were melted and kneaded by using a same direction rotating twin-screw extruder HK25D (Parker Corporation: ϕ25 mm, L/D=41), and extruded at a cylinder temperature of 280° C. to obtain a pelletized resin composition.

The thus obtained pellets were dried at 120° C. for 8 hours, and injection molded by using an injection molding apparatus (Niigata NN100, Niigata Machine Techno Co., Ltd.) under conditions of a cylinder temperature of 280° C., a screw speed of 60 rpm, an injection pressure of 130 MPa and a mold temperature of 90° C., so as to produce a test piece in accordance with each JIS test. The impact strength, the flexural modulus and the tensile strength of the produced test piece were evaluated by the following methods.

[Impact Strength]

The impact strength was measured by the Charpy impact test. Specifically, a produced test piece was measured for a Charpy impact value in accordance with JIS K-7111 under conditions of a hammer weight of 2 J, a moment of the hammer around the rotating shaft of 1.08 N·J, a hammer elevation angle of 50°, an impact speed of 2.9 m/s, and a distance between the rotating shaft and an impact point of 0.23 m.

[Flexural Modulus]

The flexural modulus was measured by a bending test. Specifically, a produced test piece was measured for an elastic modulus and strength in accordance with JIS K-7171 under conditions of a load range of 50 kg, a test speed of 2 mm/min, and a bending span of 64 mm.

[Tensile Strength]

The tensile strength was measured by a tensile test. Specifically, a produced test piece was measured for yield/rupture strength and elongation in accordance with JIS K-7162-1A under conditions of a load range of 1,000 kg, a test speed of 500 mm/min, and a gripping span of 115 mm.

Comparative Examples 13 and 14

Resin compositions were obtained in substantially the same manner as in Example 11 except that compositions of the resin compositions were changed as shown in Table 7.

The results of these evaluations are shown in Table 7.

TABLE 7

| | | | | | Example 11 | Comparative Example 13 | Comparative Example 14 |
|---|---|---|---|---|---|---|---|
| Composition | (B2) | | Polycarbonate | parts by mass | 90 | 90 | 90 |
| | (C) | | Glass Fiber | parts by mass | 10 | 10 | 10 |
| | Wax | (A) | Modified Propylene-1-butene Copolymer (A-1) of Preparation Example 1 | parts by mass | 3 | | |
| | | Alternative | Modified Propylene-ethylene Copolymer (X-3) of Preparation Example 6 | parts by mass | | 3 | |
| Evaluations | | | Impact Strength | kJ/m$^2$ | 21 | 26 | 7 |
| | | | Elastic Modulus | MPa | 3,900 | 4,000 | 3,600 |
| | | | Tensile Strength | MPa | 72 | 60 | 79 |

As shown in Table 7, it is found that the test piece of Example 11 containing the modified propylene-α-olefin copolymer (A) of the present invention is excellent in balance among the impact strength, the flexural modulus and the tensile strength as compared with the test piece of Comparative Example 14 not containing the copolymer. The reason is not clear but is presumed as follows. Since the modified propylene-α-olefin copolymer (A) contains a large number of polar groups in molecular end portions, it is finely dispersed as a rubber component in the polycarbonate (B2) so as to effectively improve the impact resistance. On the other hand, since the modified propylene-α-olefin copolymer (A) contains a large number of polar groups in molecular end portions, the crystallinity of main chains is increased, and hence, the flexural modulus and the tensile strength can be retained at high values.

Further, since the polar groups in molecular end portions of the modified propylene-α-olefin copolymer (A) have high mobility, they can be easily interacted with the glass fiber (C), and are regarded to have a high effect of opening the glass fiber. Therefore, the glass fiber can be easily finely dispersed in the polycarbonate (B2), and the modified propylene-α-olefin copolymer (A) can be effectively oriented on the surface of the glass fiber. As a result, when impact is applied to the moldable resin composition, the interfacial peel is effectively caused between the polycarbonate (B2) and the modified propylene-α-olefin copolymer (A) oriented on the surface of the glass fiber, and this probably leads to the excellent impact strength.

Furthermore, since the modified propylene-α-olefin copolymer (A) contains a large number of polar groups in molecular end portions, it is regarded to have high compatibility with the polycarbonate (B2). This leads to an artificial adhering function between the polycarbonate (B2) and the glass fiber (C), and hence, a molded product having a high flexural modulus and high tensile strength can be probably easily obtained.

5. Hot Melt Composition (Raw Materials)
Base Polymer (B3):
EVA#220 (ethylene-vinyl acetate copolymer manufactured by Du Pont-Mitsui Polychemicals Co., Ltd.)
Tackifier (D):
Aliphatic petroleum resin: Quintone M1 manufactured by Zeon Corporation
Wax:
Modified propylene-1-butene copolymer (A-1) of Preparation Example 1
Modified propylene-ethylene copolymer (X-1) of Preparation Example 4
Modified propylene-ethylene copolymer (X-2) of Preparation Example 5
Unmodified propylene-ethylene wax (Sasol Wax (tradename) H1 manufactured by Sasol Wax)

Example 12

40 parts by mass of the ethylene-vinyl acetate copolymer (EVA#220: Du Pont-Mitsui Polychemicals Co., Ltd.) as the base polymer (B3), 40 parts by mass of the aliphatic petroleum resin (Quintone M1 manufactured by Zeon Corporation) as the tackifier (D) and 20 parts by mass of the modified propylene-1-butene copolymer (A-1) of Preparation Example 1 as the modified propylene-α-olefin copolymer (A) were melted and mixed at 180° C. to prepare a hot melt composition.

Comparative Examples 13 to 15

Hot melt compositions were prepared in substantially the same manner as in Example 12 except that the modified propylene-α-olefin copolymer (A) was changed to waxes shown in Table 8.

The melt viscosity and the adhesive strength of the thus obtained hot melt compositions were measured by the following methods.
[Flowability]
The flowabilities of the obtained hot melt compositions at 140° C., 160° C. or 180° C. were visually observed and evaluated based on the following criteria.
B: Flowable
D: Solidified
[Adhesive Strength]
Each of the obtained hot melt compositions was applied on a surface of an aluminum foil (with a thickness of 50 μm) in a thickness of 15 μm. Subsequently, the aluminum foil was bent to make opposing portions of the coated surface adhere to each other, and the heat seal was performed under conditions of an upper bar set to 170° C., a lower bar set to 70° C., a heat seal pressure of 1 kg/cm², and a heat seal time of 2 seconds, so as to produce an adhesion piece including the portions of the aluminum foil adhering via a hot melt adhesive layer. This adhesion piece was cut into a width of 25 mm to be used as a sample, and the sample was subjected to a T-type peeling test under a measurement temperature of 20° C. and a pulling speed of 300 mm/min, so as to measure the adhesive strength based on the following criteria.
B: Adhesive force of 350 g/25 mm or more
D: Adhesive force less than 350 g/25 mm
The results of the evaluation are shown in Table 8.

TABLE 8

| | | | | Example 12 | Comparative Example 13 | Comparative Example 14 | Comparative Example 15 |
|---|---|---|---|---|---|---|---|
| Composition | (B3) | EVA | parts by mass | 40 | 40 | 40 | 40 |
| | (D) | Petroleum Resin | parts by mass | 40 | 40 | 40 | 40 |
| | Wax | Modified Propylene-1-butene Copolymer (A-1) of Preparation Example 1 | parts by mass | 20 | | | |
| | | Modified Propylene-ethylene Copolymer (X-1) of Preparation Example 4 | parts by mass | | 20 | | |
| | | Modified Propylene-ethylene Copolymer (X-2) of Preparation Example 5 | parts by mass | | | 20 | |
| | | Unmodified PE wax (Sasol H1) | parts by mass | | | | 20 |
| Evaluations | Flowability | 140° C. | | — | B | B | D | B |
| | | 160° C. | | — | B | B | B | B |
| | | 180° C. | | — | B | B | B | B |
| | Adhesiveness (to aluminum) | | | — | B | D | D | D |

As shown in Table 8, it is found that the hot melt composition of Example 12 containing the modified propylene-α-olefin copolymer (A) of the present invention has a superior flowability as well as higher adhesive strength than the compositions of Comparative Examples 13 to 15. The reason is not clear but is presumed as follows. Since the modified propylene-α-olefin copolymer (A) contained in the composition of Example 12 has a low melting point, the composition has a superior flowability, and since the copolymer contains a large number of polar groups in molecular end portions, it is well interacted with and is highly compatible with EVA.

This application claims priority based on Japanese patent Application No. 2013-229176, filed on Nov. 5, 2013, the entire contents of which including the specification and the drawings are incorporated herein by reference.

INDUSTRIAL APPLICABILITY

The present invention can provide a polar group-containing propylene-based wax having excellent performances of a low melting point and the like by reacting, with a polar compound having a double bond, a propylene-based wax obtained by thermal decomposition and containing a $C_{4+}$ α-olefin unit.

According to the present invention, a modified propylene-α-olefin copolymer has a low melting point, is less sticky, retains crystallinity and has high hardness even though the copolymer contains polar groups. Accordingly, the modified propylene-α-olefin copolymer of the present invention is suitable for use in various applications including a coating material, a moldable resin composition and a hot melt adhesive composition.

The modified propylene-α-olefin copolymer of the present invention is excellent in solubility and dispersibility in water or a solvent. Therefore, a coating material containing the modified propylene-α-olefin copolymer is cured at a high speed after the application, and can be increased in concentration, and when it is blended with another resin, superior compatibility is attained, and hence, varnish separation can be inhibited, coating unevenness can be reduced, and a coated surface of the coating material can be provided with blocking resistance. Therefore, a solution of the resin can be spray coated without causing a separation phenomenon, and hence it is useful for a paint, a primer, an adhesive and a binder for an ink that can be spray-coated. Furthermore, the coating material is not sticky on the surface of a coated film, and exhibits excellent adhesiveness to various molded products and the like, and therefore, it is used in various fields including an industrial material field and a building material field as a coating material, a paint, a primer, an adhesive, a pressure-sensitive adhesive, a binder for an ink, and the like for plastic, metal, paper, wood, fiber, leather, glass, rubber, ceramic, concrete and the like. Further, it is also used as a filler dispersant or a pigment dispersant in a paint, a sintering aid, or a binder of ceramics or a metallurgical formulation.

A moldable resin composition containing the modified propylene-α-olefin copolymer of the present invention is excellent in balance among mechanical characteristics such as impact strength, bending strength and tensile strength.

A hot melt adhesive composition containing the modified propylene-α-olefin copolymer of the present invention is excellent in flowability and highly adhesive to a base material because compatibility of the modified propylene-α-olefin copolymer with a base polymer or a tackifying resin is superior.

The modified propylene-α-olefin copolymer of the present invention can be used in various other applications in addition to those described above. For example, it can be used in various applications such as olefin-based paints, resin modifiers, heat sealing agents, anti-wear agents for printing inks, surface coating agents, additives for thermal transfer recording media, non-woven fabric modifiers, tonner additives, glazing agents, mold releasing agents for resin molding, rubber processing aids, paper quality improvers, fiber processing aids, electrical insulating agents, compounding agents of natural wax, anti-fogging agents for polyolefin films, pigment dispersants (masterbatch), molding aids, antioxidants for rubber, paper coatings, fiber finishing agents, lubricants for PVC, additives for asphalt, nucleating agents for expanded polystyrene, lost wax, and a component of candles.

The invention claimed is:

1. A modified propylene-α-olefin copolymer (A) having an acid value of 0.5 to 100 KOHmg/g obtained by grafting at least one selected from unsaturated carboxylic acids and derivatives thereof and unsaturated sulfonic acids and salts thereof onto a propylene-α-olefin copolymer (A1),
wherein the propylene-α-olefin copolymer (A1) contains 60 to 95 mol % of a propylene-derived constitutional unit (a) and 5 to 40 mol % of a $C_{4+}$ α-olefin-derived constitutional unit (b), a total amount of the constitutional unit (a) and the constitutional unit (b) being 100 mol %, and the propylene-α-olefin copolymer (A1) satisfies all of requirements below (i) to (iv):
(i) a weight average molecular weight (Mw) measured by GPC of 3,000 to 40,000;
(ii) a melting point (Tm) measured by DSC of 60 to 110° C.;
(iii) a half width of a crystalline melting point peak measured by the DSC of 1 to 20° C.; and
(iv) a number of vinylidene groups per 1,000 carbon atoms measured by $^1$H-NMR of 0.5 to 5; and
wherein a crystallization temperature ratio Tc(A1)/Tc(A) is 1.0 to 1.6, the Tc(A) being a crystallization temperature (° C.) of the modified propylene-α-olefin copolymer (A) and the Tc(A1) being a crystallization temperature (° C.) of the propylene-α-olefin copolymer (A1).

2. The modified propylene-α-olefin copolymer (A) according to claim 1, wherein the propylene-α-olefin copolymer (A1) is obtained by thermally decomposing a propylene-$C_{4+}$ α-olefin copolymer (A2).

3. The modified propylene-α-olefin copolymer (A) according to claim 2, wherein the propylene-$C_{4+}$ α-olefin copolymer (A2) contains 60 to 95 mol % of a propylene-derived constitutional unit (a') and 5 to 40 mol % of a $C_{4+}$ α-olefin-derived constitutional unit (b'), wherein a total amount of the constitutional unit (a') and the constitutional unit (b') is 100 mol %, and satisfies all of requirements below (i') to (iii'):
(i') a weight average molecular weight (Mw) measured by the GPC of 50,000 to 1,000,000;
(ii') a melting point (Tm) measured by the DSC of 60 to 120° C.; and
(iii') a half width of a crystalline melting point peak measured by the DSC of 1 to 20° C.

4. The modified propylene-α-olefin copolymer (A) according to claim 1, wherein the propylene-α-olefin copolymer (A1) further satisfies requirement below (v):
(v) a ΔH of a melting peak measured by the DSC of 40 to 100 J/g.

5. A method for producing a modified propylene-α-olefin copolymer (A) comprising:
thermally decomposing a propylene-C4+ α-olefin copolymer (A2) to obtain a propylene-α-olefin copolymer (A1) containing 60 to 95 mol % of a propylene-derived constitutional unit (a) and 5 to 40 mol % of a C4+ α-olefin-derived constitutional unit (b), wherein a total amount of the constitutional unit (a) and the constitutional unit (b) is 100 mol %, and satisfying all of requirements below (i) to (iv):
(i) a weight average molecular weight (mw) measured by GPC of 3,000 to 40,000;
(ii) a melting point (Tm) measured by DSC of 60 to 110° C.;
(iii) a half width of a crystalline melting point peak measured by the DSC of 1 to 20° C.; and
(iv) a number of vinylidene groups per 1,000 carbon atoms measured by $^1$H-NMR of 0.5 to 5; and
graft polymerizing at least one selected from unsaturated carboxylic acids and derivatives thereof and unsaturated sulfonic acids and salts thereof onto the propylene-α-olefin copolymer (A1) to obtain a modified propylene-α-olefin copolymer (A) having an acid value of 0.5 to 100 KOHmg/g, and
wherein a crystallization temperature ratio Tc(A1)/Tc(A) is 1.0 to 1.6, Tc(A) being a crystallization temperature (° C.) of the modified propylene-α-olefin copolymer (A) and Tc(A1) being a crystallization temperature (° C.) of the propylene-α-olefin copolymer (A1).

6. The method for producing a modified propylene-α-olefin copolymer (A) according to claim 5, wherein the propylene-α-olefin copolymer (A1) is obtained by thermally decomposing the propylene-$C_{4+}$ α-olefin copolymer (A2) at 300 to 450° C. for 5 minutes to 10 hours.

7. The method for producing a modified propylene-α-olefin copolymer (A) according to claim 5, wherein the propylene-$C_{4+}$ α-olefin copolymer (A2) contains 60 to 95 mol % of a propylene-derived constitutional unit (a') and 5 to 40 mol % of a $C_{4+}$ α-olefin-derived constitutional unit (b'), wherein a total amount of the constitutional unit (a') and the constitutional unit (b') is 100 mol %, and satisfies all of requirements below (i') to (iii'):
(i') a weight average molecular weight (Mw) measured by the GPC of 50,000 to 1,000,000;
(ii') a melting point (Tm) measured by the DSC of 60 to 120° C.; and
(iii') a half width of a crystalline melting point peak measured by the DSC of 1 to 20° C.

8. A resin composition comprising the modified propylene-α-olefin copolymer (A) according to claim 1, and a second resin (B1),
wherein a weight ratio between the modified propylene-α-olefin copolymer (A) and the second resin (B1) is 1/99 to 90/10.

9. A coating material comprising 100 parts by weight of water or an organic solvent, and 0.1 to 100 parts by weight of the modified propylene-α-olefin copolymer (A) according to claim 1 dissolved or dispersed in the water or the organic solvent.

10. A coating material comprising 100 parts by weight of water or an organic solvent, and 0.1 to 100 parts by weight in total of the modified propylene-α-olefin copolymer (A) according to claim 1 and a second resin (B1) dissolved or dispersed in the water or the organic solvent,
wherein a weight ratio between the modified propylene-α-olefin copolymer (A) and the second resin (B1) is 1/99 to 90/10.

11. The coating material according to claim 9, wherein the organic solvent has a solubility parameter value in a range of 7 to 12 $(cal/cm^3)^{1/2}$.

12. The coating material according to claim 9, wherein the organic solvent contains at least one selected from hydrocarbon-based solvents, alcohol-based solvents and ester-based solvents.

13. The coating material according to claim 9, wherein the modified propylene-α-olefin copolymer (A) is completely dissolved in the organic solvent at a temperature of 50° C. or more.

14. A moldable resin composition comprising:
100 to 50 parts by weight of at least one resin (B2) selected from the group consisting of thermoplastic resins and thermosetting resins;
0 to 50 parts by weight of an inorganic reinforcing material (C), wherein a total amount of the resin (B2) and the reinforcing material (C) is 100 parts by weight; and
0.01 to 10 parts by weight of the modified propylene-α-olefin copolymer (A) according to claim 1.

15. A hot melt composition comprising:
100 parts by weight of a base polymer (B3);
10 to 300 parts by weight of a tackifier (D); and
1 to 100 parts by weight of the modified propylene-α-olefin copolymer (A) according to claim 1.

16. A paint comprising the modified propylene-α-olefin copolymer (A) according to claim 1, or the modified propylene-α-olefin copolymer (A) according to claim 1 and a second resin (B1).

17. A primer comprising the modified propylene-α-olefin copolymer (A) according to claim 1, or the modified propylene-α-olefin copolymer (A) according to claim 1 and a second resin (B1).

18. An adhesive comprising the modified propylene-α-olefin copolymer (A) according to claim 1, or the modified propylene-α-olefin copolymer (A) according to claim 1 and a second resin (B1).

19. A pressure-sensitive adhesive comprising the modified propylene-α-olefin copolymer (A) according to claim 1, or the modified propylene-α-olefin copolymer (A) according to claim 1 and a second resin (B1).

20. A sintering aid comprising the modified propylene-α-olefin copolymer (A) according to claim 1, or the modified propylene-α-olefin copolymer (A) according to claim 1 and a second resin (B1).

* * * * *